(12) United States Patent  (10) Patent No.: US 9,178,444 B2
Maru et al.  (45) Date of Patent: Nov. 3, 2015

(54) MULTI-MODE FLYBACK CONTROL FOR A SWITCHING POWER CONVERTER

(71) Applicant: Cirrus Logic, Inc., Austin, TX (US)

(72) Inventors: Siddharth Maru, Austin, TX (US); Zhaohui He, Austin, TX (US); Mohit Sood, Austin, TX (US)

(*) Notice: Subject to any disclaimer, the term of this patent is extended or adjusted under 35 U.S.C. 154(b) by 54 days.

(21) Appl. No.: 13/715,914

(22) Filed: Dec. 14, 2012

(65) Prior Publication Data

US 2013/0154496 A1   Jun. 20, 2013

Related U.S. Application Data

(60) Provisional application No. 61/570,554, filed on Dec. 14, 2011.

(51) Int. Cl.
*H05B 37/02* (2006.01)
*H02M 7/217* (2006.01)
(Continued)

(52) U.S. Cl.
CPC ............ *H02M 7/217* (2013.01); *H02M 1/4258* (2013.01); *H02M 1/44* (2013.01);
(Continued)

(58) Field of Classification Search
CPC ........... H05B 33/0815; H05B 33/0848; H05B 37/02; H02M 3/1582; H02M 2001/0012; Y02B 20/48; Y02B 70/1475
USPC .......... 315/200 R, 209 R, 225, 210, 247, 291, 315/294, 297, 307, 308, 312; 323/207, 212, 323/282, 287; 363/21.12, 89
See application file for complete search history.

(56) References Cited

U.S. PATENT DOCUMENTS 3,790,878 A   2/1974  Brokaw
4,677,366 A   6/1987  Wilkinson et al.
(Continued)

FOREIGN PATENT DOCUMENTS

EP   0536535 A1   4/1993
EP   0636889 A1   1/1995
(Continued)

OTHER PUBLICATIONS

Texas Instruments, High Performance Power Factor Preregulator, UC2855A/B and UC3855A/B, SLUS328B, Jun. 1998, Revised Oct. 2005, pp. 1-14, Dallas, TX, USA.
(Continued)

*Primary Examiner* — Haissa Philogene
(74) *Attorney, Agent, or Firm* — Terrile, Cannatti, Chambers & Holland, LLP; Kent B. Chambers

(57) ABSTRACT

In at least one embodiment, an electronic system and method includes a controller to control a switching power converter in at least two different modes of operation depending on whether the controller detects a dimmer or not and/or whether a load requests more power than either of the two operational modes can provide. In at least one embodiment, the controller detects whether a dimmer is phase cutting an input voltage to a switching power converter. The controller operates the switching power converter in a first mode if the dimmer is detected, and the controller operates the switching power converter in a second mode if the dimmer is not detected. The controller also transitions between operating the switching power converter in the first mode and the second mode if a status of detection of the dimmer changes.

22 Claims, 8 Drawing Sheets

(51) Int. Cl.
  *H02M 1/44*      (2007.01)
  *H02M 3/335*     (2006.01)
  *H02M 5/257*     (2006.01)
  *H05B 33/08*     (2006.01)
  *H02M 1/42*      (2007.01)
  *H02M 1/00*      (2007.01)

(52) U.S. Cl.
  CPC ...... *H02M3/33507* (2013.01); *H02M 3/33523* (2013.01); *H02M 5/2576* (2013.01); *H05B 33/0815* (2013.01); *H05B 37/02* (2013.01); *H02M 2001/0006* (2013.01); *H02M 2001/0048* (2013.01); *Y02B 20/346* (2013.01); *Y02B 20/347* (2013.01); *Y02B 70/126* (2013.01); *Y02B 70/1491* (2013.01)

(56) References Cited

U.S. PATENT DOCUMENTS

| | | |
|---|---|---|
| 4,683,529 A | 7/1987 | Bucher |
| 4,737,658 A | 4/1988 | Kronmuller et al. |
| 4,739,462 A | 4/1988 | Farnsworth et al. |
| 4,937,728 A | 6/1990 | Leonardi |
| 4,940,929 A | 7/1990 | Williams |
| 4,977,366 A | 12/1990 | Powell |
| 5,001,620 A | 3/1991 | Smith |
| 5,003,454 A | 3/1991 | Bruning |
| 5,055,746 A | 10/1991 | Hu et al. |
| 5,109,185 A | 4/1992 | Ball |
| 5,173,643 A | 12/1992 | Sullivan et al. |
| 5,264,780 A | 11/1993 | Bruer et al. |
| 5,278,490 A | 1/1994 | Smedley |
| 5,383,109 A | 1/1995 | Maksimovic et al. |
| 5,424,932 A | 6/1995 | Inou et al. |
| 5,430,635 A | 7/1995 | Liu |
| 5,479,333 A | 12/1995 | McCambridge et al. |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,808,453 A | 9/1998 | Lee et al. |
| 5,874,725 A | 2/1999 | Yamaguchi |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,091,233 A | 7/2000 | Hwang et al. |
| 6,160,724 A | 12/2000 | Hemena et al. |
| 6,229,292 B1 | 5/2001 | Redl et al. |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,356,040 B1 | 3/2002 | Preis et al. |
| 6,445,600 B2 | 9/2002 | Ben-Yaakov |
| 6,469,484 B2 | 10/2002 | L'Hermite et al. |
| 6,510,995 B2 | 1/2003 | Muthu et al. |
| 6,531,854 B2 | 3/2003 | Hwang |
| 6,580,258 B2 | 6/2003 | Wilcox et al. |
| 6,583,550 B2 | 6/2003 | Iwasa |
| 6,628,106 B1 | 9/2003 | Batarseh et al. |
| 6,657,417 B1 | 12/2003 | Hwang |
| 6,696,803 B2 | 2/2004 | Tao et al. |
| 6,724,174 B1 | 4/2004 | Esteves et al. |
| 6,768,655 B1 | 7/2004 | Yang et al. |
| 6,781,351 B2 | 8/2004 | Mednik et al. |
| 6,839,247 B1 | 1/2005 | Yang |
| 6,882,552 B2 | 4/2005 | Telefus et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 6,980,446 B2 | 12/2005 | Simada et al. |
| 7,072,191 B2 | 7/2006 | Nakao et al. |
| 7,099,163 B1 | 8/2006 | Ying |
| 7,161,816 B2 | 1/2007 | Shteynberg et al. |
| 7,221,130 B2 | 5/2007 | Ribeiro et al. |
| 7,233,135 B2 | 6/2007 | Noma et al. |
| 7,266,001 B1 | 9/2007 | Notohamiprodjo et al. |
| 7,292,013 B1 | 11/2007 | Chen et al. |
| 7,295,452 B1 | 11/2007 | Liu |
| 7,411,379 B2 | 8/2008 | Chu |
| 7,554,473 B2 | 6/2009 | Melanson |
| 7,606,532 B2 | 10/2009 | Wuidart |
| 7,667,986 B2 | 2/2010 | Artusi et al. |
| 7,684,223 B2 | 3/2010 | Wei |
| 7,719,246 B2 | 5/2010 | Melanson |
| 7,719,248 B1 | 5/2010 | Melanson |
| 7,746,043 B2 | 6/2010 | Melanson |
| 7,804,480 B2 | 9/2010 | Jeon et al. |
| 7,834,553 B2 * | 11/2010 | Hunt et al. ............ 315/101 |
| 7,872,883 B1 | 1/2011 | Elbanhawy |
| 7,894,216 B2 | 2/2011 | Melanson |
| 8,008,898 B2 | 8/2011 | Melanson et al. |
| 8,169,806 B2 | 5/2012 | Sims et al. |
| 8,193,717 B2 * | 6/2012 | Leiderman ............ 315/219 |
| 8,222,772 B1 | 7/2012 | Vinciarelli |
| 8,242,764 B2 * | 8/2012 | Shimizu et al. ........... 323/285 |
| 8,369,109 B2 | 2/2013 | Niedermeier et al. |
| 8,441,210 B2 * | 5/2013 | Shteynberg et al. ........ 315/308 |
| 8,536,799 B1 * | 9/2013 | Grisamore et al. ........ 315/294 |
| 8,610,364 B2 * | 12/2013 | Melanson et al. ........ 315/200 R |
| 8,803,439 B2 * | 8/2014 | Stamm et al. ............ 315/291 |
| 8,816,593 B2 * | 8/2014 | Lys et al. ............ 315/200 R |
| 2003/0090252 A1 | 5/2003 | Hazucha |
| 2003/0111969 A1 | 6/2003 | Konishi et al. |
| 2003/0160576 A1 | 8/2003 | Suzuki |
| 2003/0174520 A1 | 9/2003 | Bimbaud |
| 2003/0214821 A1 | 11/2003 | Giannopoulos et al. |
| 2003/0223255 A1 | 12/2003 | Ben-Yaakov |
| 2004/0046683 A1 | 3/2004 | Mitamura et al. |
| 2004/0196672 A1 | 10/2004 | Amei |
| 2005/0057237 A1 | 3/2005 | Clavel |
| 2005/0207190 A1 | 9/2005 | Gritter |
| 2005/0231183 A1 | 10/2005 | Li et al. |
| 2005/0270813 A1 | 12/2005 | Zhang et al. |
| 2005/0275354 A1 | 12/2005 | Hausman |
| 2006/0013026 A1 | 1/2006 | Frank et al. |
| 2006/0022648 A1 | 2/2006 | Zeltser |
| 2006/0214603 A1 | 9/2006 | Oh et al. |
| 2007/0103949 A1 | 5/2007 | Tsuruya |
| 2008/0018261 A1 | 1/2008 | Kastner |
| 2008/0043504 A1 | 2/2008 | Ye |
| 2008/0062584 A1 | 3/2008 | Freitag et al. |
| 2008/0062586 A1 | 3/2008 | Apfel |
| 2008/0117656 A1 | 5/2008 | Clarkin |
| 2008/0130336 A1 | 6/2008 | Taguchi |
| 2008/0175029 A1 | 7/2008 | Jung et al. |
| 2008/0259655 A1 | 10/2008 | Wei et al. |
| 2008/0278132 A1 | 11/2008 | Kesterson et al. |
| 2008/0310194 A1 | 12/2008 | Huang et al. |
| 2009/0059632 A1 | 3/2009 | Li et al. |
| 2009/0067204 A1 | 3/2009 | Ye et al. |
| 2009/0108677 A1 | 4/2009 | Walter et al. |
| 2009/0184665 A1 | 7/2009 | Ferro |
| 2009/0243582 A1 | 10/2009 | Irissou et al. |
| 2009/0295300 A1 | 12/2009 | King |
| 2010/0128501 A1 | 5/2010 | Huang et al. |
| 2010/0238689 A1 | 9/2010 | Fei et al. |
| 2010/0244793 A1 | 9/2010 | Caldwell |
| 2011/0110132 A1 | 5/2011 | Rausch |
| 2011/0199793 A1 | 8/2011 | Kuang |
| 2011/0276938 A1 | 11/2011 | Perry et al. |
| 2011/0291583 A1 | 12/2011 | Shen |
| 2011/0309760 A1 | 12/2011 | Beland et al. |

(56) References Cited

U.S. PATENT DOCUMENTS

| | | |
|---|---|---|
| 2012/0056551 A1 | 3/2012 | Zhu et al. |
| 2012/0146540 A1 | 6/2012 | Khayat et al. |
| 2012/0176819 A1 | 7/2012 | Gao et al. |
| 2012/0187997 A1 | 7/2012 | Liao et al. |
| 2012/0248998 A1 | 10/2012 | Yoshinaga |
| 2012/0320640 A1 | 12/2012 | Baurle et al. |
| 2013/0181635 A1 | 7/2013 | Ling |
| 2014/0218978 A1 | 8/2014 | Heuken et al. |

FOREIGN PATENT DOCUMENTS

| | | |
|---|---|---|
| EP | 1213823 A2 | 6/2002 |
| EP | 1289107 A3 | 8/2002 |
| EP | 1962263 A2 | 8/2008 |
| EP | 2232949 | 9/2010 |
| EP | 2257124 A1 | 12/2010 |
| JP | 2008053181 A | 3/2006 |
| WO | 01/84697 A2 | 11/2001 |
| WO | 2004/051834 A1 | 6/2004 |
| WO | 2006013557 A1 | 2/2006 |
| WO | 2006/022107 A1 | 3/2006 |
| WO | 2007016373 A3 | 2/2007 |
| WO | 2008/004008 A2 | 1/2008 |
| WO | 2008152838 A2 | 12/2008 |
| WO | 2010011971 A1 | 1/2010 |
| WO | 2011008635 A1 | 1/2011 |

OTHER PUBLICATIONS

Balogh, Laszlo, et al,Power-Factor Correction with Interleaved Boost Converters in Continuous-Inductr-Current Mode, 1993, IEEE, pp. 168-174, Switzerland.

Cheng, Hung L., et al, A Novel Single-Stage High-Power-Factor Electronic Ballast with Symmetrical Topology, Power Electronics and Motion Control Conference, 2006. IPEMC 2006. CES/IEEE 5th International, Aug. 14-16, 2006, vol. 50, No. 4, Aug. 2003, pp. 759-766, Nat. Ilan Univ., Taiwan.

Fairchild Semiconductor, Theory and Application of the ML4821 Average Current Mode PFC Controllerr, Fairchild Semiconductor Application Note 42030, Rev. 1.0, Oct. 25, 2000, pp. 1-19, San Jose, California, USA.

Garcia, O., et al, High Efficiency PFC Converter to Meet EN610000302 and A14, Industrial Electronics, 2002. ISIE 2002. Proceedings of the 2002 IEEE International Symposium, vol. 3, pp. 975-980, Div. de Ingenieria Electronica, Univ. Politecnica de Madrid, Spain.

Infineon Technologies AG, Standalone Power Factor Correction (PFC) Controller in Continuous Conduction Mode (CCM), Infineon Power Management and Supply, CCM-PFC, ICE2PCS01, ICE2PCS01G, Version 2.1, Feb. 6, 2007, p. 1-22, Munchen, Germany.

Lu, et al, Bridgeless PFC Implementation Using One Cycle Control Technique, International Rectifier, 2005, pp. 1-6, Blacksburg, VA, USA.

Brown, et al, PFC Converter Design with IR1150 One Cycle Control IC, International Rectifier, Application Note AN-1077, pp. 1-18, El Segundo CA, USA.

International Rectifer, PFC One Cycle Control PFC IC, International Rectifier, Data Sheet No. PD60230 rev. C, IR1150(S)(PbF), IR11501(S)(PbF), Feb. 5, 2007, pp. 1-16, El Segundo, CA, USA.

International Rectifier, IRAC1150=300W Demo Board, User's Guide, Rev 3.0, International Rectifier Computing and Communications SBU—AC-DC Application Group, pp. 1-18, Aug. 2, 2005, El Segundo, CO USA.

Lai, Z., et al, A Family of Power-Factor-Correction Controller, Applied Power Electronics Conference and Exposition, 1997. APEC '97 Conference Proceedings 1997., Twelfth Annual, vol. 1, pp. 66-73, Feb. 23-27, 1997, Irvine, CA.

Lee, P, et al, Steady-State Analysis of an Interleaved Boost Converter with Coupled Inductors, IEEE Transactions on Industrial Electronics, vol. 47, No. 4, Aug. 2000, pp. 787-795, Hung Hom, Kowloon, Hong Kong.

Linear Technology, Single Switch PWM Controller with Auxiliary Boost Converter, Linear Technology Corporation, Data Sheet LT1950, pp. 1-20, Milpitas, CA, USA.

Linear Technology, Power Factor Controller, Linear Technology Corporation, Data Sheet LT1248, pp. 1-12, Milpitas, CA, USA.

Supertex, Inc., HV9931 Unity Power Factor LED Lamp Driver, Supertex, Inc., Application Note AN-H52, 2007, pp. 1-20, Sunnyvale, CA, USA.

Ben-Yaakov, et al, The Dynamics of a PWM Boost Converter with Resistive Input, IEEE Transactions on Industrial Electronics, vol. 46., No. 3, Jun. 1999, pp. 1-8, Negev, Beer-Sheva, Israel.

Erickson, Robert W., et al, Fundamentals of Power Electronics, Second Edition, Chapter 6, 2001, pp. 131-184, Boulder CO, USA.

Stmicroelectronics, CFL/TL Ballast Driver Preheat and Dimming L6574, Sep. 2003, pp. 1-10, Geneva, Switzerland.

Fairchild Semiconductor, 500W Power-Factor-Corrected (PFC) Converter Design with FAN4810, Application Note 6004, Rev. 1.0.1, Oct. 31, 2003, pp. 1-14, San Jose, CA, USA.

Fairfield Semiconductor, Power Factor Correction (PFC) Basics, Application Note 42047, Rev. 0.9.0, Aug. 19, 2004, pp. 1-11, San Jose, CA, USA.

Fairchild Semiconductor, Design of Power Factor Correction Circuit Using FAN7527B, Application Note AN4121, Rev. 1.0.1, May 30, 2002, pp. 1-12, San Jose, CA, USA.

Fairchild Semiconductor, Low Start-Up Current PFC/PWM Controller Combos FAN4800, Rev. 1.0.6, Nov. 2006, pp. 1-20, San Jose, CA, USA.

Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.

Fairchild Semiconductor, ZVS Average Current PFC Controller FAN 4822, Rev. 1.0.1, Aug. 10, 2001, pp. 1-10, San Jose, CA, USA.

Prodic, et al, Dead-Zone Digital Controller for Improved Dynamic Response of Power Factor Preregulators, Applied Power Electronics Conference and Exposition, 2003, vol. 1, pp. 382-388, Boulder CA, USA.

Philips Semiconductors, 90W Resonant SMPS with TEA1610 Swing Chip, Application Note AN99011, Sep. 14, 1999, pp. 1-28, The Netherlands.

Fairchild Semiconductor, Power Factor Correction Controller FAN7527B, Aug. 16, 2003, pp. 1-12, San Jose, CA, USA.

On Semiconductor, Power Factor Controller for Compact and Robust, Continuous Conduction Mode Pre-Converters, NCP1654, Mar. 2007, Rev. PO, pp. 1-10, Denver, CO, USA.

Fairchild Semicondctor, Simple Ballast Controller, KA7541, Rev. 1.0.3, Sep. 27, 2001, pp. 1-14, San Jose, CA, USA.

Fairchild Semiconductor, Power Factor Controller, ML4812, Rev. 1.0.4, May 31, 2001, pp. 1-18, San Jose, CA, USA.

Prodic, et al, Digital Controller for High-Frequency Rectifiers with Power Factor Correction Suitable for On-Chip Implementation, Power Conversion Conference-Nagoya, 2007. PCC '07, Apr. 2-5, 2007, pp. 1527-1531, Toronto, Canada.

Freescale Semiconductor, Dimmable Light Ballast with Power Factor Correction, Designer Reference Manual, DRM067, Rev. 1, Dec. 2005, M681-1C08 Microcontrollers, pp. 1-72, Chandler, AZ, USA.

Freescale Semiconductor, Design of Indirect Power Factor Correction Using 56F800/E, Freescale Semiconductor Application Note, AN1965, Rev. 1, Jul. 2005, pp. 1-20, Chandler, AZ, USA.

Freescale Semiconductor, Implementing PFC Average Current Mode Control using the MC9S12E128, Application Note AN3052, Addendum to Reference Design Manual DRM064, Rev. 0, Nov. 2005, pp. 1-8, Chandler, AZ, USA.

Hirota, et al, Analysis of Single Switch Delta-Sigma Modulated Pulse Space Modulation PFC Converter Effectively Using Switching Power Device, Power Electronics Specialists Conference, 2002. pesc 02. 2002 IEEE 33rd Annual, vol. 2, pp. 682-686, Hyogo Japan.

Madigan, et al, Integrated High-Quality Rectifier-Regulators, Industrial Electronics, IEEE Transactions, vol. 46, Issue 4, pp. 749-758, Aug. 1999, Cary, NC, USA.

(56) References Cited

OTHER PUBLICATIONS

Renesas, Renesas Technology Releases Industry's First Critical-Conduction-Mode Power Factor Correction Control IC Implementing Interleaved Operations, R2A20112, pp. 1-4, Dec. 18, 2006, Tokyo, Japan.
Renesas, PFC Control IC R2A20111 Evaluation Board, Application Note R2A20111 EVB, all pages, Feb. 2007, Rev. 1.0, pp. 1-39, Tokyo, Japan.
Miwa, et al, High Efficiency Power Factor Correction Using Interleaving Techniques, Applied Power Electronics Conference and Exposition, 1992. APEC '92. Conference Proceedings 1992., Seventh Annual, Feb. 23-27, 1992, pp. 557-568, MIT, Cambridge, MA, USA.
Noon, Jim, High Performance Power Factor Preregulator UC3855A/B, Texas Instruments Application Report, SLUA146A, May 1996—Revised Apr. 2004, pp. 1-35, Dallas TX, USA.
NXP Semiconductors, TEA1750, GreenChip III SMPS Control IC Product Data Sheet, Rev.01, Apr. 6, 2007, pp. 1-29, Eindhoven, The Netherlands.
Turchi, Joel, Power Factor Correction Stages Operating in Critical Conduction Mode, On Semiconductor, Application Note AND8123/D, Sep. 2003-Rev. 1 , pp. 1-20, Denver, CO, USA.
On Semiconductor, GreenLine Compact Power Factor Controller: Innovative Circuit for Cost Effective Solutions, MC33260, Semiconductor Components Industries, Sep. 2005—Rev. 9, pp. 1-22, Denver, CO, USA.
On Semiconductor, Enhanced, High Voltage and Efficient Standby Mode, Power Factor Controller, NCP1605, Feb. 2007, Rev. 1, pp. 1-32, Denver, CO, USA.
On Semiconductor, Cost Effective Power Factor Controller, NCP1606, Mar. 2007, Rev. 3, pp. 1-22, Denver, CO, USA.
Renesas, Power Factor Correction Controller IC, HA16174P/FP, Rev. 1.0, Jan. 6, 2006, pp. 1-38, Tokyo, Japan.
Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.
Stmicroelectronics, Electronic Ballast with PFC using L6574 and L6561, Application Note AN993, May 2004, pp. 1-20, Geneva, Switzerland.
Stmicroelectronics, Advanced Transition-Mode PFC Controller L6563 and L6563A, Mar. 2007, pp. 1-40, Geneva, Switzerland.
Maksimovic, et al, Impact of Digital Control in Power Electronics, International Symposium on Power Semiconductor Devices and ICS, 2004, pp. 2-22, Boulder, Colorado, USA.
Fairchild Semiconductor, Ballast Control IC, FAN 7711, Rev. 1.0.3, 2007, pp. 1-23, San Jose,California, USA.
Yao, Gang et al, Soft Switching Circuit for Interleaved Boost Converters, IEEE Transactions on Power Electronics, vol. 22, No. 1, Jan. 2007, pp. 1-8, Hangzhou China.
Stmicroelectronics, Transition Mode PFC Controller, Datasheet L6562, Rev. 8, Nov. 2005, pp. 1-16, Geneva, Switzerland.
Zhang, Wanfeng et al, A New Duty Cycle Control Strategy for Power Factor Correction and FPGA Implementation, IEEE Transactions on Power Electronics, vol. 21, No. 6, Nov. 2006, pp. 1-10, Kingston, Ontario, Canada.
Stmicroelectronics, Power Factor Connector L6561, Rev 16, Jun. 2004, pp. 1-13, Geneva, Switzerland.
Texas Instruments, Avoiding Audible Noise at Light Loads When Using Leading Edge Triggered PFC Converters, Application Report SLUA309A, Mar. 2004—Revised Sep. 2004, pp. 1-4, Dallas, Texas, USA.
Texas Instruments, Startup Current Transient of the Leading Edge Triggered PFC Controllers, Application Report SLUA321, Jul. 2004, pp. 1-4, Dallas, Texas, USA.
Texas Instruments, Current Sense Transformer Evaluation UCC3817, Application Report SLUA308, Feb. 2004, pp. 1-3, Dallas, Texas, USA.

Texas Instruments, BiCMOS Power Factor Preregulator Evaluation Board UCC3817, User's Guide, SLUU077C, Sep. 2000—Revised Nov. 2002, pp. 1-10, Dallas, Texas, USA.
Texas Instruments, Interleaving Continuous Conduction Mode PFC Controller, UCC28070, SLUS794C, Nov. 2007—Revised Jun. 2009, pp. 1-45, Dallas, Texas, USA.
Texas Instruments, 350-W Two-Phase Interleaved PFC Pre-regulator Design Review, Application Report SLUA369B, Feb. 2005—Revised Mar. 2007, pp. 1-22, Dallas, Texas, USA.
Texas Instruments, Average Current Mode Controlled Power Factor Correction Converter using TMS320LF2407A, Application Report SPRA902A, Jul. 2005, pp. 1-15, Dallas, Texas, USA.
Texas Instruments, Transition Mode PFC Controller, UCC28050, UCC28051, UCC38050, UCC38051, Application Note SLUS515D, Sep. 2002—Revised Jul. 2005, pp. 1-28, Dallas, Texas, USA.
Unitrode, High Power-Factor Preregulator, UC1852, UC2852, UC3852, Feb. 5, 2007, pp. 1-8, Merrimack, Maine, Usa.
Unitrode, Optimizing Performance in UC3854 Power Factor Correction Applications, Design Note DN 39E, 1999, pp. 1-6, Merrimack, Maine, USA.
On Semiconductor Four Key Steps to Design a Continuous Conduction Mode PFC Stage Using the NCP1653, Application Note AND8184/D, Nov. 2004, pp. 1-8, Phoenix, AZ, USA.
Unitrode, BiCMOS Power Factor Preregulator, Texas Instruments, UCC2817, UCC2818, UCC3817, UCC3818, SLUS3951, Feb. 2000—Revised Feb. 2006, pp. 1-25, Dallas, Texas, USA.
Unitrode, UC3854A/B and UC3855A/B Provide Power Limiting with Sinusoidal Input Current for PFC Front Ends, SLUA196A, Design Note DN-66, Jun. 1995—Revised Nov. 2001, pp. 1-6, Merrimack, Maine, USA.
Unitrode, Programmable Output Power Factor Preregulator, UCC2819, UCC3819, SLUS482B, Apr. 2001—Revised Dec. 2004, pp. 1-16, Merrimack, Maine, USA.
Texas Instruments, UCC281019, 8-Pin Continuous Conduction Mode (CCM) PFC Controller, SLU828B, Revised Apr. 2009, pp. 1-48, Dallas, Texas, USA.
http://toolbarpdf.com/docs/functions-and-features-of=inverters.html, Jan. 20, 2011, pp. 1-8.
Zhou, Jinghai, et al, Novel Sampling Algorithm for DSP Controlled 2kW PFC Converter, IEEE Transactions on Power Electronics, vol. 16, No. 2, Mar. 2001, pp. 1-6, Hangzhou, China.
Mammano, Bob, Current Sensing Solutions for Power Supply Designers, Texas Instruments, 2001, pp. 1-36, Dallas, Texas, USA.
Fairchild Semiconductor, Ballast Control IC FAN7532, Rev. 1.0.3, Jun. 2006, pp. 1-16, San Jose, California, USA.
Fairchild Semiconductor, Simple Ballast Controller, FAN7544, Rev. 1.0.0, Sep. 21, 2004, pp. 1-14, San Jose, California, USA.
Su, et al, Ultra Fast Fixed-Frequency Hysteretic Buck Converter with Maximum Charging Current Control and Adaptive Delay Compensation for DVS Applications, IEEE Journal of Solid-State Circuits, vol. 43, No. 4, Apr. 2008, pp. 815-822, Hong Kong University of Science and Technology, Hong Kong, China.
Wong, et al, "Steady State Analysis of Hysteretic Control Buck Converters", 2008 13th International Power Electronics and Motion Control Conference (EPE-PEMC 2008), pp. 400-404, 2008, National Semiconductor Corporation, Power Management Design Center, Hong Kong, China.
Zhao, et al, Steady-State and Dynamic Analysis of a Buck Converter Using a Hysteretic PWM Control, 2004 35th Annual IEEE Power Electronics Specialists Conference, pp. 3654-3658, Department of Electrical & Electronic Engineering, Oita University, 2004, Oita, Japan.
International Search Report, PCT/US2012/069942, European Patent Office, Jul. 21, 2014, pp. 1-5.
Written Opinion, PCT/US2012/069942, European Patent Office, Jul. 21, 2014, pp. 1-8.
Response to the Written Opinion accompanying the International Report on Patentability as filed in European Patent Application No. 12809953.8 on Apr. 7, 2015, pp. 1-4.

* cited by examiner

US 9,178,444 B2

MULTI-MODE FLYBACK CONTROL FOR A SWITCHING POWER CONVERTER

CROSS-REFERENCE TO RELATED APPLICATION

This application claims the benefit under 35 U.S.C. §119(e) and 37 C.F.R. §1.78 of U.S. Provisional Application No. 61/570,554, filed on Dec. 14, 2011, which is incorporated by reference in its entirety. This application also claims the benefit under 35 U.S.C. §119(e) and 37 C.F.R. §1.78 of U.S. Provisional Application No. 61/675,399, filed on Jul. 25, 2012.

BACKGROUND OF THE INVENTION

1. Field of the Invention

The present invention relates in general to the field of electronics, and more specifically to a system and method that provides multi-mode flyback control for a switching power converter.

2. Description of the Related Art

Many electronic systems utilize switching power converters to efficiently convert power from one source into power useable by a device (referred to herein as a "load"). Some facilities, such as homes and buildings, include light source dimming circuits (referred to herein as a "dimmer"). Dimmers control the power delivered to a load, such as a lamp having one or more light sources. Dimming saves energy and, in a lighting installation, also allows a user to adjust the intensity of the light source to a desired level.

A switching power converter is controlled by a controller. For systems that are not intended for use with dimmers, the controller provides power factor correction for displacement and distortion so that the phases of an alternating current (AC) supply voltage and an average input current to the switching power converter are approximately in-phase (power factor displacement) and the current shape follows the shape of the supply voltage (power factor distortion). For systems that include dimmers and constant current loads, the controller controls the switching power converter to provide a constant, average input current to the load without regard to power factor correction.

FIG. 1 depicts an electronic system 100 that converts power from voltage supply 102 into power usable by load 104. Load 104 is a constant current load that includes, for example, one or more light emitting diodes (LEDs). A controller 106 controls the power conversion process. Voltage source 102 can be any type of voltage source such as a public utility supplying a 60 Hz/110 V input voltage $V_{IN}$ in North America or a 50 Hz/220 V input voltage $V_{IN}$ in Europe or the People's Republic of China, or a DC voltage source supplied by a battery or another switching power converter. The dimmer 103 phase cuts the supply voltage $V_{SUPPLY}$, and the full-bridge rectifier 105 rectifies the phase-cut supply voltage to generate a rectified phase-cut input voltage $V_{IN}$ to the flyback-type switching power converter 110. In at least one embodiment, the dimmer 103 is a triac-based dimmer.

The controller 106 provides a pulse width modulated (PWM) control signal $CS_0$ to current control switch 108 in a flyback-type, switching power converter 110 to control the conversion of input voltage $V_{IN}$ into a primary-side voltage $V_P$ and secondary voltage $V_S$. When the switch 108 is non-conductive, i.e. "off", the primary voltage $V_P$ is N times the secondary voltage $V_S$, i.e. $V_P = N \cdot V_S$, and "N" is a ratio of turns in the primary-winding 114 to the turns in the secondary-winding 118. The switch 108 is, for example, a field effect transistor (FET). When control signal $CS_0$ causes switch 108 to conduct, a primary-side current $i_{IN}$ flows into a primary-winding 114 of transformer 116 to energize the primary-winding 114. When switch 108 conducts, the diode 120 is reverse biased, and the secondary-side current $i_S$ is zero. When control signal $CS_0$ opens switch 108, the primary voltage $V_P$ and secondary voltage $V_S$ reverse the indicated polarities, and diode 120 is forward biased. When diode 120 is forward biased, the secondary side current $i_S$ flows through the diode 120 to charge capacitor 122 so that an approximately constant current and direct current (DC) voltage $V_{LD}$ is provided to the load 104. Since the dimmer 103 is present, the controller 106 controls the input current $i_{IN}$ as a constant current.

SUMMARY OF THE INVENTION

In one embodiment of the present invention, a method includes detecting whether a dimmer is phase cutting an input voltage to a switching power converter and operating the switching power converter in a first mode if the dimmer is detected. The method further includes operating the switching power converter in a second mode if the dimmer is not detected and transitioning between operating the switching power converter in the first mode and the second mode if a status of detection of the dimmer changes.

In another embodiment of the present invention, an apparatus includes to control a switching power converter. The controller is configured to detect whether a dimmer is phase cutting an input voltage to a switching power converter and operate the switching power converter in a first mode if the dimmer is detected. The controller is further configured to operate the switching power converter in a second mode if the dimmer is not detected and transition between operating the switching power converter in the first mode and the second mode if a status of detection of the dimmer changes.

In a further embodiment of the present invention, an apparatus includes a switching power converter and a controller coupled to the switching power converter. The controller is configured to detect whether a dimmer is phase cutting an input voltage to a switching power converter and operate the switching power converter in a first mode if the dimmer is detected. The controller is further configured to operate the switching power converter in a second mode if the dimmer is not detected and transition between operating the switching power converter in the first mode and the second mode if a status of detection of the dimmer changes.

In another embodiment of the present invention, an apparatus includes a switching power converter and a controller coupled to the switching power converter. The controller includes a dimmer detector and the dimmer detector generates a dimmer detection output that controls operational characteristics of the switching power converter in one of at least two different operational modes depending on whether the detector detects a dimmer

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
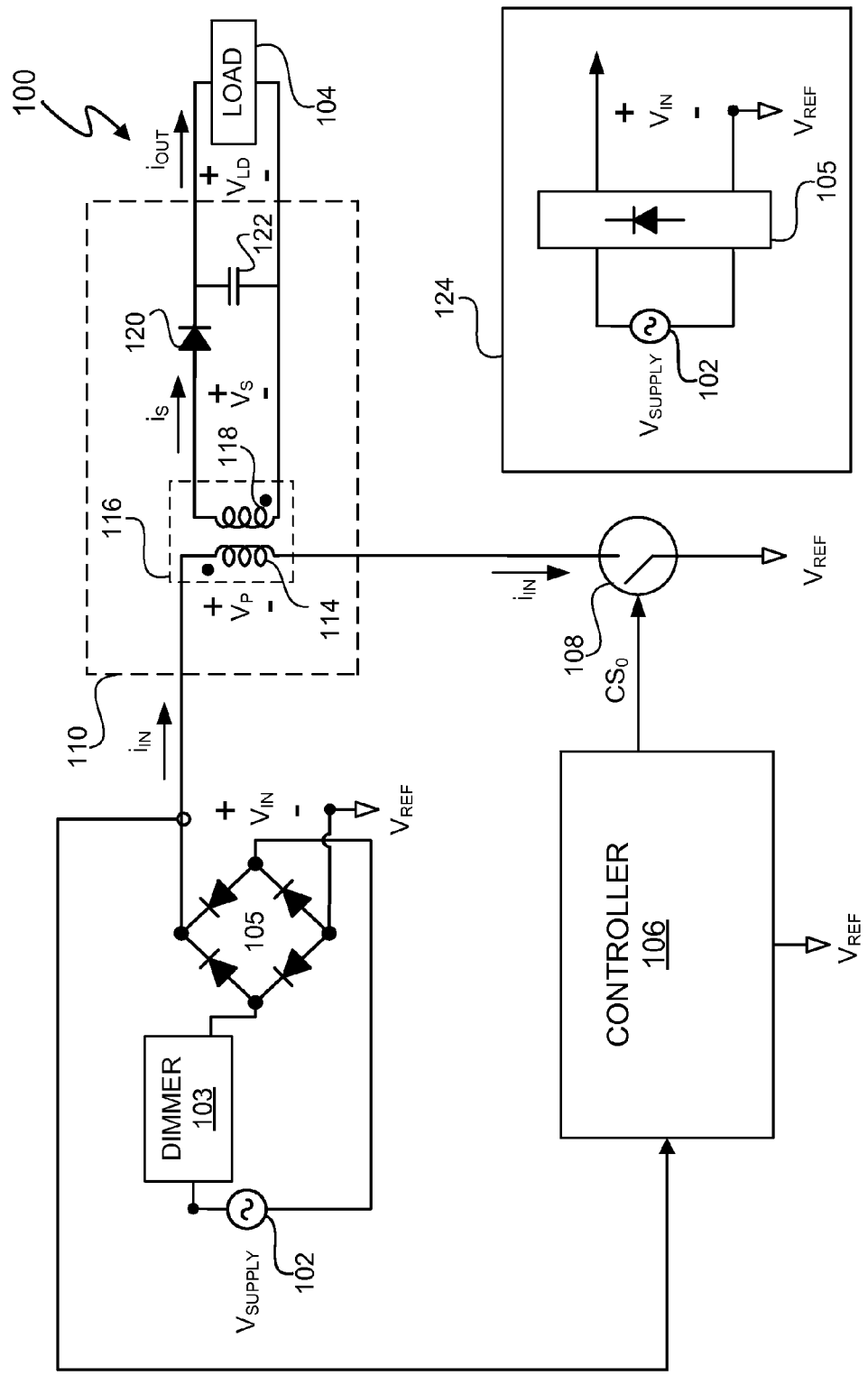
FIG. 1 (labeled prior art) depicts an electronic system that provides either power factor correction or a constant current.

In at least one embodiment, an electronic system and method includes a controller to control a switching power converter in at least two different modes of operation depending on whether the controller detects a dimmer or not and/or if a current being drawn by the switching power converter should be reduced to optimize efficiency of the system by reducing power dissipation. In at least one embodiment, the controller detects whether a dimmer is phase cutting an input voltage to a switching power converter. The controller operates the switching power converter in a first mode if the dimmer is detected, and the controller operates the switching power converter in a second mode if the dimmer is not detected. The controller also transitions between operating the switching power converter in the first mode and the second mode if a status of detection of the dimmer changes. In at least one embodiment, in the first mode the controller operates the switching power converter to draw a substantially constant average input current to the switching power converter averaged for an approximately constant dimmer level (referred to as a "constant input current control mode" or "Dimmer Mode") while a switching power converter control signal is active. The switching power converter control signal is active when the control signal regularly changes logical states. In at least one embodiment, the controller operates the switching power converter to draw an input current to the switching power converter to provide power factor correction (referred to as "PFC control mode" or "No Dimmer Mode"). In at least one embodiment, the controller also operates in a High Power Mode to provide a current to a load by combining current control operations from the Dimmer Mode and the No Dimmer Mode. In at least one embodiment, a dimmer is considered to be "not detected" if the input voltage is substantially passed by the dimmer In at least one embodiment, the input voltage to the switching power converter is a rectified version of a supply voltage. Thus, in this embodiment, a cycle of the input voltage represents a half-line cycle of the supply voltage. In at least one embodiment, the input voltage is substantially passed by the dimmer if, in at least one embodiment, at least 160 degrees of a cycle of the input voltage is passed, in another embodiment at least 170 degrees of a cycle of the input voltage is passed, or in another embodiment all of a cycle of the input voltage is passed.

Having a multi-mode current control allows the controller to obtain operational efficiencies. In at least one embodiment, the controller operates the switching power converter differently depending on whether the switching power converter is operating in Dimmer Mode or No Dimmer Mode, and each mode has different areas of power usage. For example, in at least one embodiment, for a flyback-type switching power converter, when the controller detects a dimmer, during an active control signal period the controller causes the flyback switching power converter to pull a pre-programmed constant average input current greater than a dimmer hold current to help ensure that a triac-based dimmer does not disconnect and mis-fire. When a dimmer is not detected, the controller operates the flyback switching power converter in No Dimmer Mode and shapes an input current to follow an input supply voltage. In at least one embodiment, a dimmer is detected when the dimmer is phase cutting a supply voltage. Furthermore, in at least one embodiment, the controller transitions between the Dimmer Mode and No Dimmer Mode without abruptly changing an amount of charge delivered to a load, which avoids power surges as indicated by, for example, flicker in a light source. Thus, in at least one embodiment, the capability to operate in at least constant input current control mode, PFC control mode, and to transition between the two modes allows the system to optimize system performance in both the dimmer and no-dimmer cases.

In at least one embodiment, the controller operates the switching power converter in a "High Power Mode", which combines current control from the Dimmer Mode and the No Dimmer Mode. In at least one embodiment, operating in the High Power Mode allows the current to reduce an average input current and shape the input current to provide power factor correction. In at least one embodiment, the High Power Mode extends an active period of the switching power converter control signal to approximately match a complete half line cycle of a supply voltage to the switching power converter. In at least one embodiment, operating in the High Power Mode improves efficiency while maintaining output current regulation.

Figure 2:
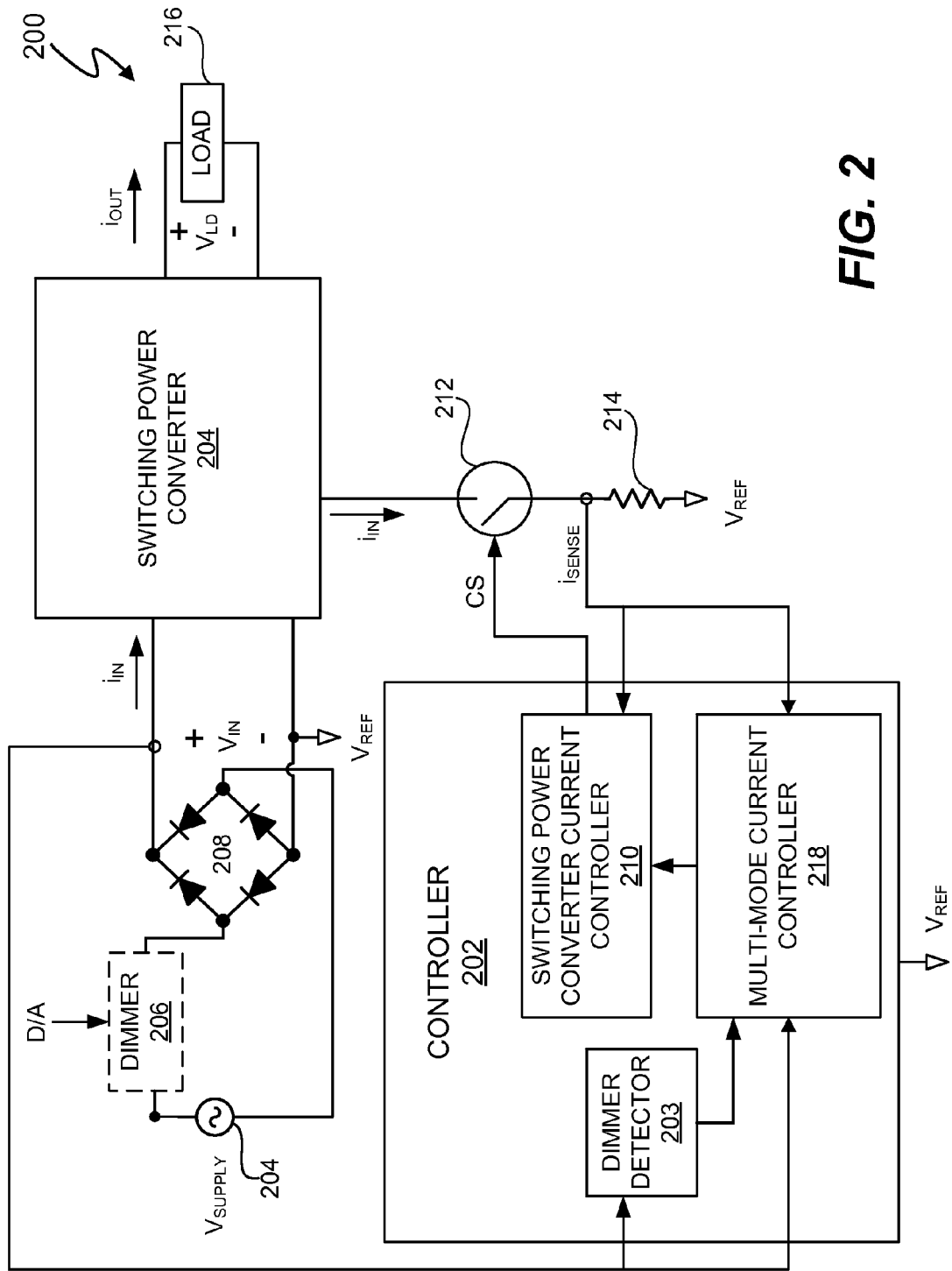
FIG. 2 depicts an electronic system having a controller that operates a switching power converter in any of multiple input current control modes.

FIG. 2 depicts an electronic system 200 having a controller 202 that operates the switching power converter 204 in any of multiple input current control modes depending on, for example, whether the controller 202 detects a presence of the optional dimmer 206 or not. The term "optional" is used because the dimmer 206 may be present and actively phase-cuts the supply voltage $V_{SUPPLY}$, may be present and may not phase-cut the supply voltage $V_{SUPPLY}$, or may be absent from the system 200. The switching power converter 204 can be any type of switching power converter such as a flyback, boost, buck, boost-buck, or Cúk type switching power converter. The electronic system 200 receives power from a voltage supply 204. The voltage supply 204 is an AC supply and, in at least one embodiment, is identical to voltage supply 102 (FIG. 1). The dimmer 206 phase cuts the supply voltage $V_{SUPPLY}$, and the full-bridge diode rectifier 208 rectifies the phase-cut supply voltage $V_{SUPPLY}$ to generate the phase-cut input voltage $V_{IN}$. The dimmer 206 can be any type of dimmer, and, in at least one embodiment, the dimmer 206 is a triac-based dimmer. In other embodiments, the dimmer 206 is an electronic dimmer that uses well-known components such as high power field effect transistors (FETs) to phase-cut the supply voltage $V_{SUPPLY}$. The dimmer 206 can be disabled by asserting the disable signal D/A so that the input voltage $V_{IN}$ is not phase-cut.

The controller 202 includes a switching power converter current controller 210 to generate a control signal CS to control conductivity of switch 212. In at least one embodiment, the control signal CS is a pulse modulated signal, and the switch 212 is a FET. When the switch 212 conducts, the input current $i_{IN}$ flows through the switching power converter 204, the switch 212 and the sense resistor 214. Controlling the input current $i_{IN}$ controls the output current $i_{OUT}$ of the switching power converter 204, which controls the load voltage $V_{LD}$ to the load 216. The load 216 can be any type of load, including one or more lamps having one or more light emitting diodes.

The controller 202 also includes a multi-mode current controller 218. In at least one embodiment, the multi-mode current controller 218 allows the system 200 to operate in at least two different current control modes of operation. As subsequently described in more detail, in at least one embodiment, the amount of charge $Q_{PUSHED}$ provided to the load 216 from switching power converter 204 depends on the value of the peak current $i_{PEAK}$ of the input current $i_{IN}$. The peak current $i_{PEAK}$ value depends on the pulse width T1, the period TT, and, the decay time $T_2$ of the secondary-side current $i_S$ for each cycle of the switch control signal CS.

Figure 3:
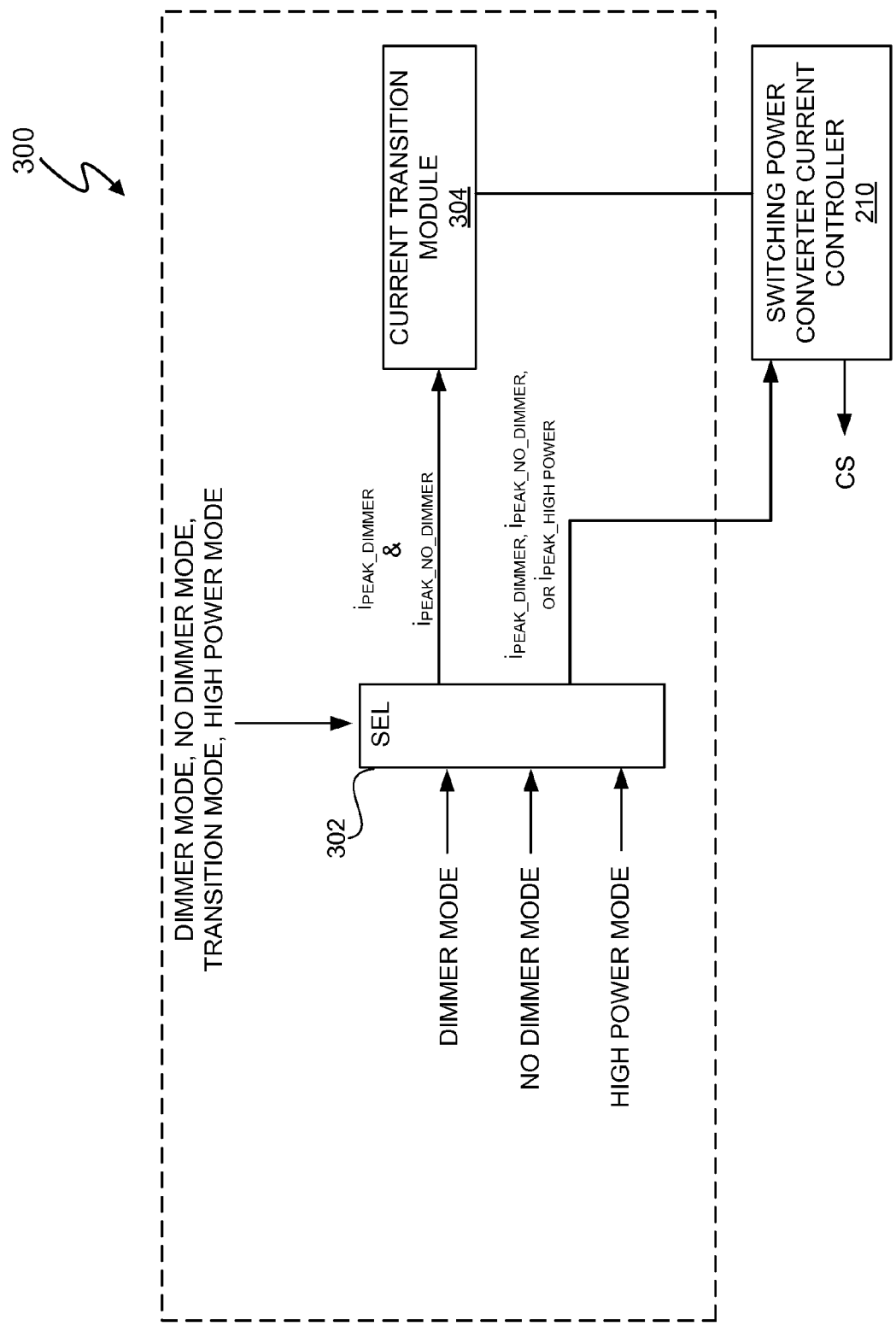
FIG. 3 depicts a functional multi-mode operational diagram for the controller of FIG. 2.

FIG. 3 depicts a functional multi-mode operational diagram 300 that conceptually depicts embodiments of multi-mode operations of multi-mode current controller 218 and switching power converter current controller 210 for controlling the switching power converter 204. Referring to FIGS. 2 and 3, in at least one embodiment, the controller 202 operates the switching power converter 204 in the Dimmer Mode, No Dimmer Mode, a Transition Mode to transition between the Dimmer Mode and No Dimmer Mode depending on whether and when the controller 202 detects the dimmer 206 or not and in a High Power Mode if the load 216 generally demands a high input current. In at least one embodiment, the quantitative measure of "high" is a matter of design choice, and, in at least one embodiment, is determined during manufacture of the system 200 that includes controller 202. In at least one embodiment, a high current is a current greater than or equal to 20 mA. In at least one embodiment, the controller 202 includes a dimmer detector 203 to detect whether the dimmer 206 is substantially phase cutting the input voltage $V_{IN}$ to the switching power converter 204. U.S. patent application Ser. No. 13/077,483, entitled "Dimmer Detection", inventors Robert T. Grisamore, et al., filing date Mar. 31, 2011, and assignee Cirrus Logic, Inc. describes exemplary embodiments of detecting a dimmer U.S. patent application Ser. No. 13/077,483 is hereby incorporated by reference in its entirety. The dimmer detector 203 generates an output signal DD to notify the multi-mode current controller 218 if a dimmer is detected or not.

The controller 202 operates the switching power converter 204 in a first mode if the dimmer 206 is detected, and the controller 202 operates the switching power converter 204 in a second mode if the dimmer 206 is not detected. The controller 202 also transitions between operating the switching power converter 204 in the first mode and the second mode if a status of detection of the dimmer 206 changes. In at least one embodiment, in the first mode the controller 202 operates the switching power converter 204 to draw a substantially constant average input current $i_{IN}$ to the switching power converter 204 for each cycle of the input voltage $V_{IN}$ when the control signal CS is active, averaged for an approximately constant dimmer level (referred to as a "constant input current control mode" or "Dimmer Mode"). A half cycle of the supply voltage $V_{SUPPLY}$ equals a cycle of the rectified input voltage $V_{IN}$. In at least one embodiment, during the No Dimmer Mode, the controller 202 operates the switching power converter 204 to shape the input current $i_{IN}$ to the switching power converter 204 to provide power factor correction. Furthermore, in at least one embodiment, the controller 202 transitions, in a Transition Mode, between the Dimmer Mode and No Dimmer Mode without abruptly changing an amount of charge delivered to the load 216, which avoids power surges as indicated by, for example, flicker in a light source load 216. Thus, in at least one embodiment, the capability to operate in at least Dimmer Mode, No Dimmer Mode, and to transition between the two modes allows the system to optimize system performance whether a dimmer 206 is detected or not.

The functional multi-mode operational diagram 300 depicts a conceptual process 302 that receives three mode inputs. If Dimmer Mode is selected based on detection of the dimmer 206, the first input, DIMMER MODE indicates that the controller 202 will determine the peak input current $i_{PEAK}$ in accordance with a Dimmer Mode control process, and switching power converter current controller 210 will determine the switch control signal CS in accordance with a peak input current $i_{PEAK}$ equal to $i_{PEAK\_DIMMER}$. If No Dimmer Mode is selected based on the absence of detecting dimmer 206, the second input, NO DIMMER MODE indicates that the controller 202 will determine the peak input current $i_{PEAK}$ in accordance with a No Dimmer Mode control process, and the switching power converter current controller 210 will determine the switch control signal CS in accordance with a peak input current $i_{PEAK}$ equal to $i_{PEAK\_NO\_DIMMER}$. If TRANSITION MODE is selected based on detection of the dimmer 206 followed by no detection or vice versa, the first and second inputs combine to indicate that the controller 202 will determine the peak current $i_{PEAK}$ in accordance with a Transition Mode process, and the switching power converter current controller 210 will determine the switch control signal CS in accordance with a peak input current $i_{PEAK}$ representing a transitioning combination of the $i_{PEAK\_NO\_DIMMER}$ and $i_{PEAK\_NO\_DIMMER}$ values. The current transition module 304 provides a smooth transition between the Dimmer Mode and the No Dimmer Mode so that, in at least one embodiment, the switching power converter current controller 210 controls the output current $i_{OUT}$ of switching power converter 204 in FIG. 2 without any significant discontinuities. If operated in High Power Mode, the control signal CS is determined using current control operations from both the Dimmer Mode and No Dimmer Mode current control operations and, thus, uses a combination of the $i_{PEAK\_NO\_DIMMER}$ and $i_{PEAK\_NO\_DIMMER}$ values. In at least one embodiment, the values of $i_{PEAK\_NO\_DIMMER}$ and $i_{PEAK\_NO\_DIMMER}$ are summed together to form the combination. Thus, the controller 202 operates the switching power converter 204 differently depending on whether the switching power converter 204 is Dimmer Mode, No Dimmer Mode, Transition Mode, or High Power Mode.

Figure 4:
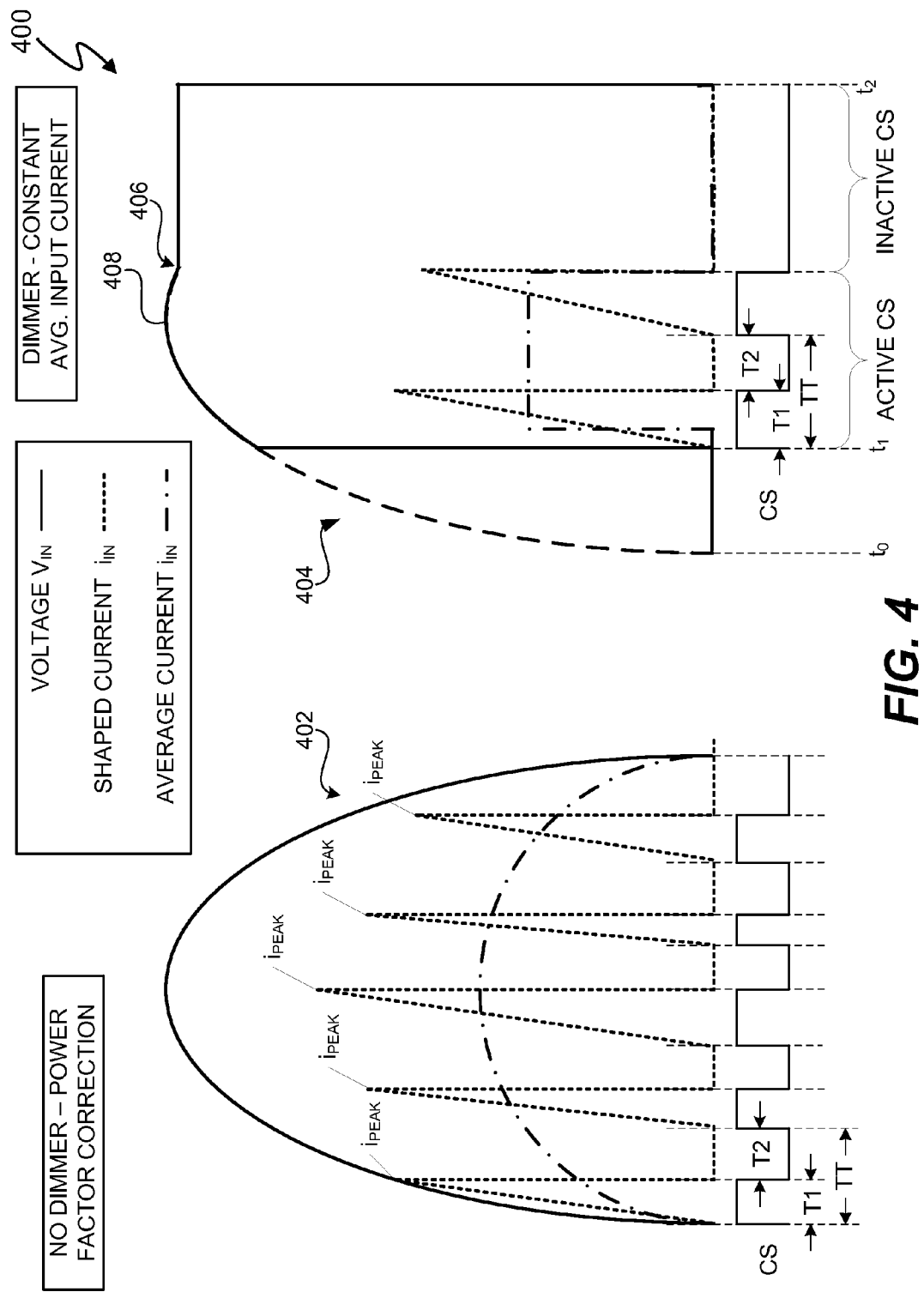
FIG. 4 depicts exemplary dimmer mode and no dimmer mode waveforms.

FIG. 4 depicts exemplary no-dimmer and dimmer current control waveforms 400. Waveforms 402 represent No Dimmer Mode waveforms and specifically represent a cycle of the rectified input voltage $V_{IN}$ (which is a half line cycle of the supply voltage $V_{SUPPLY}$), shaped input current $i_{IN}$, and an active control signal CS. Waveforms 404 represent an exemplary Dimmer Mode input line cycle of the voltage $V_{IN}$, constant average input current $i_{IN}$ while the control signal CS is active. The frequency of the rectified input voltage $V_{IN}$ is generally 100-120 Hz, and the frequency of the control signal CS and, thus, the modulated input current $i_{IN}$ is generally greater than 10 kHz and often greater than 20 kHz-25 kHz, such as 100 kHz, to avoid audible frequencies. Waveforms 402 and 404 depict a low frequency control signal CS and modulated input current $i_{IN}$ for purposes of illustration. Each cycle of the control signal CS has a period TT, a pulse width T1 (logical 1 value), and an off time T2 (logical 0 value). At the point 406, the switching power converter 204 has pushed sufficient charge to the load 216, and the switching power converter current controller 210 drives the control signal CS to a logical 0 until an end of the cycle of the input voltage $V_{IN}$. In the Dimmer Mode waveforms 404, the cycle of the input voltage $V_{IN}$ begins at time $t_0$ and ends at the zero crossing time $t_2$. The dimmer 206 passes the input voltage $V_{IN}$ from the leading edge at time $t_1$ until $t_2$. In waveforms 404, the cycle of the input voltage $V_{IN}$ is a half line cycle of the supply voltage $V_{SUPPLY}$, and, thus, the cycle of the input voltage is 180° of the half line cycle of the supply voltage $V_{SUPPLY}$. The beginning of the cycle of the input voltage $V_{IN}$ at time $t_0$ is 0°, the peak 408 is 90°, and the end is 180° with all other portions of the input voltage $V_{IN}$ residing from 0° to 180°. In the depicted waveforms 404, the leading edge at time $t_1$ occurs prior to the peak 408 of the input voltage $V_{IN}$, and, thus, the dimmer 206 passes more than 90° of the input voltage $V_{IN}$.

In the Dimmer Mode waveforms 404, the control signal CS is active when periodically changing states to cause the input current $i_{IN}$ to rise to the peak value $i_{PEAK}$. The control signal CS is inactive after sufficient charge has been delivered to the load 216. In at least one embodiment, the "sufficient charge" is an amount of charge equal to a target charge $Q_{TARGET}$ as illustratively defined in Equation 2 below. The input current $i_{IN}$ maintains an approximately constant average value while the control signal CS is active.

Referring to FIGS. 2 and 4, during time T1, the modulated input current $i_{IN}$ rises to a peak value $i_{PEAK}$ at the end of time T1. During time T2, the modulated input current $i_{IN}$ is approximately 0 A. For a flyback type switching power converter 204, energy is transferred to the load 216 during the period T2. In the No Dimmer Mode, the peak value $i_{PEAK}$ of the input current $i_{IN}$ tracks the shape of the shape of the input voltage $V_{IN}$ waveform in accordance with the second term of Equation 1 below to provide power factor correction. In the Dimmer Mode, the peak value $i_{PEAK}$ is controlled to in accordance with the first term of Equation 1 below to provide an approximately constant average current $i_{OUT}$ to the load 216 during when the control signal CS is active. The number of pulses M of the control signal CS during the active time corresponds to a particular dimmer level indicated by the phase-cut angle of the input voltage $V_{IN}$. Thus, in at least one embodiment, the amount of charge provided to the load 216 is determined by a level of the constant average input current $i_{IN}$ and the number of cycles M of the control signal CS during a cycle of the input voltage $V_{IN}$.

Figure 5:
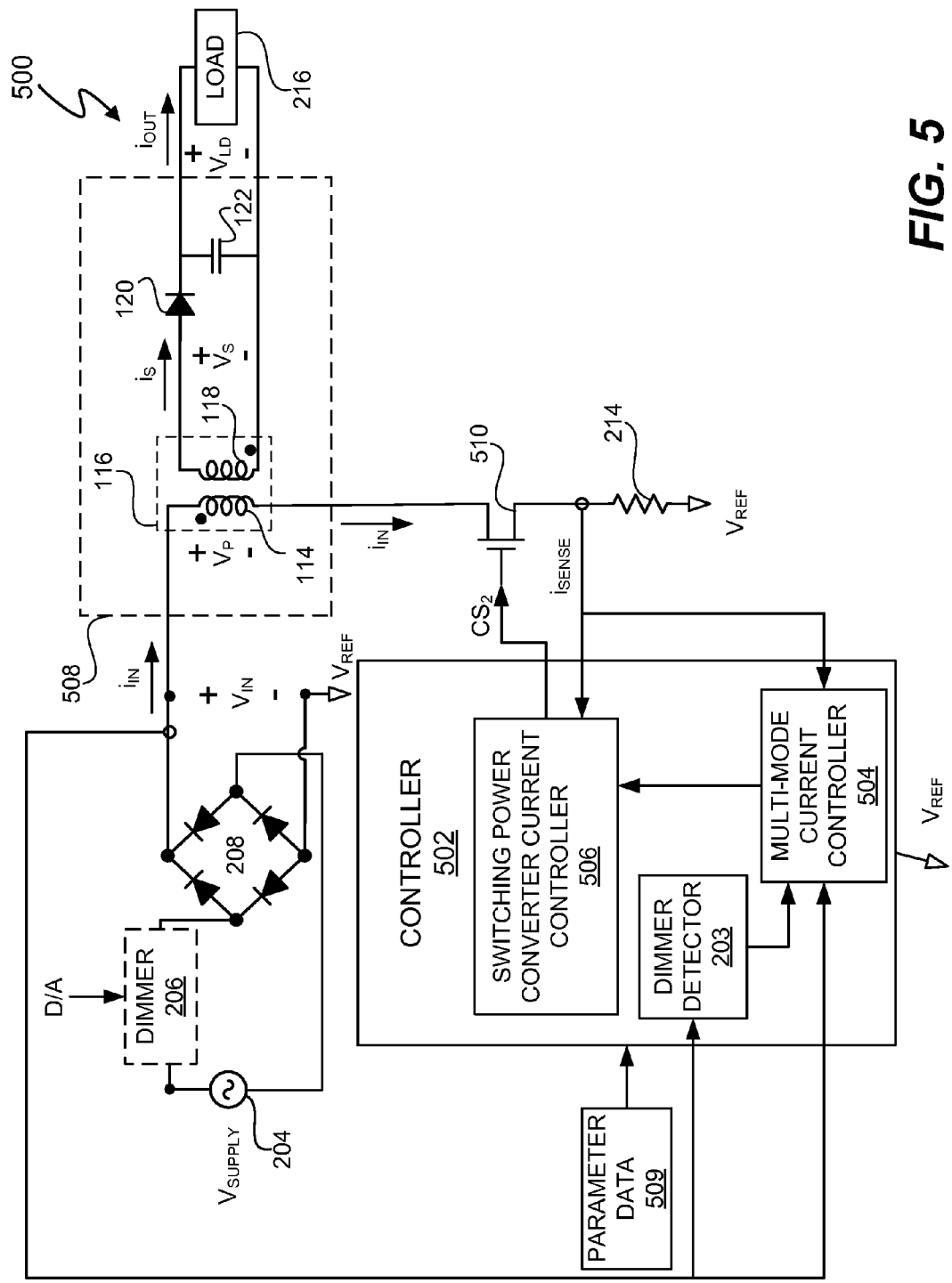
FIG. 5 depicts an embodiment of the electronic system of FIG. 2.

FIG. 5 depicts an electronic system 500 that includes a controller 502, which respectively represents embodiments of the electronic system 200 and controller 202. The controller 502 includes a multi-mode current controller 504 and a switching power converter current controller 506, which respectively represent embodiments of the multi-mode current controller 218 and the switching power converter current controller 210. The controller 502 controls the flyback switching power converter 508. The flyback switching power converter 508 represents one embodiment of the switching power converter 204. In at least one embodiment, the electrical processes of transferring energy from the primary-winding 114 of transformer 116 to the secondary-winding 118 and load 216 are as previously described in conjunction with the switching power converter 110 of FIG. 1. FET 510 represents one embodiment of the switch 212, and switch control signal $CS_2$ represents one embodiment of the switch control signal CS of FIG. 2.

In general, the multi-mode current controller 500 determines the peak current $i_{PEAK}$ so that the load 216 receives an amount of charge $Q_{PUSHED}$ that is commensurate with (i) a dimming level from dimmer 206, if a dimmer 206 is detected, (ii) power factor correction when no dimmer 206 is detected, (iii) a smooth transition between the Dimmer Mode and No Dimmer Mode during a Transition Mode, and (iv) an amount of current to be provided to a load during a High Power Mode. When the controller 502 detects the presence of the dimmer 206, the controller 502 operates the flyback switching power converter 508 in Dimmer Mode so that the input current $i_{IN}$ has an approximately constant average value during an active time of the control signal $CS_2$. In Dimmer Mode, the controller 502 generates the control signal $CS_2$ so that the average constant input current $i_{IN}$ is greater than a dimmer hold current to help ensure that the dimmer 206 does not disconnect and mis-fire. In at least one embodiment, the average constant input current $i_{IN}$ is set by a target average input current value $i_{IN\_AVG\_T}$. The value of the target average input current value $i_{IN\_AVG\_T}$ can be set in any manner, such as providing the value as parameter data 509 via a programmable input, a wireless input, or a resistance value of an attached resistor. In at least one embodiment, the target average input current value $i_{IN\_AVG\_T}$ is set to be greater than a hold current value of the dimmer 206. When the controller 502 does not detect the dimmer 206, the controller 502 operates the flyback switching power converter 508 in No Dimmer Mode and shapes the input current $i_{IN}$ to follow the input voltage $V_{IN}$. In at least one embodiment, in the No Dimmer Mode, the dimmer 206 is present but is not actively phase cutting the supply voltage $V_{SUPPLY}$, and, thus, the dimmer 206 is not detected by the controller 202. The controller 502 shapes the input current $i_{IN}$ shaping using primary-winding control by sensing the input voltage $V_{IN}$ and the flyback time T2 to determine the appropriate peak value $i_{PEAK}$ of the input current $i_{IN}$. In at least one embodiment, a dimmer 206 is considered to be "not detected" if the input voltage $V_{IN}$ is substantially passed by the dimmer 206. The particular value of the amount of the input voltage $V_{IN}$ that is passed for the controller 502 to consider the dimmer 206 is a matter of design choice. In at least one embodiment, the input voltage $V_{IN}$ is substantially passed by the dimmer if, in at least one embodiment, at least 160 degrees of a cycle of the input voltage $V_{IN}$ is passed, in at least one embodiment at least 170 degrees of a cycle of the input voltage $V_{IN}$ is passed, or in at least one embodiment all (i.e. 180°) of a cycle of the input voltage $V_{IN}$ is passed.

In at least one embodiment, in general the amount of charge that is transferred from the primary-winding 114 to the secondary-winding 118 and, thus, to load 216 depends on a peak value $i_{PEAK}$ of the input current $i_{IN}$ per cycle of the control signal $CS_2$ and the number M cycles of the control signal $CS_2$ during a cycle of the input voltage $V_{IN}$. In at least one embodiment, the multi-mode current controller 504 determines the peak current value $i_{PEAK}$ in accordance with Equation 1:

$$I_{PEAK} = \left(2 \times i_{IN\_AVG\_T} \times \frac{TT}{T_1}\right) + \left(Q_e \times \frac{V_{IN}}{V_{IN\_PEAK}}\right) \qquad \text{Equation 1}$$

$AVG_{IN\_AVG\_T}$ represents the average target value of the input current $i_{IN}$.

TT=switching period of the control signal $CS_2$ measured from a previous cycle of the control signal $CS_2$.

T1 is the pulse width of the control signal $CS_2$ measured from a previous cycle of the control signal $CS_2$.

$V_{IN}$ is the input voltage to the switching power converter 508.

$V_{IN\_PEAK}$ is the peak input voltage during a switching cycle of the control signal $CS_2$.

$Q_e$ is a charge integration error as subsequently discussed.

For subsequent reference $$\left(2 \times i_{IN\_AVG\_T} \times \frac{TT}{T_1}\right)$$

is the first term of Equation 1, and $$\left(Q_e \times \frac{V_{IN}}{V_{IN\_PEAK}}\right)$$

is the second term of Equation 1.

The multi-mode current controller 504 provides the peak current value $i_{PEAK}$ to the switching power converter current controller 506. The switching power converter current controller 506 also monitors the value of sense current $i_{SENSE}$ to determine when the input current $i_{IN}$ has reached the peak value $i_{PEAK}$ or approximately the peak value $i_{PEAK}$ to take into consideration latencies in the determination of the value of input current $i_{IN}$. The switching power converter 506 changes the value of the control signal $CS_2$ to a logical 0 to turn OFF switch 510 when the input current $i_{IN}$ reaches the peak value $i_{PEAK}$.

The first term of Equation 1 utilizes a predetermined target average input current value $i_{IN\_AVG\_T}$ and pulse width T1 and switching period TT measured from the preceding cycle of the of the control signal $CS_2$ to determine the peak value $i_{PEAK}$ of the input current $i_{IN}$ for each cycle of the input voltage $V_{IN}$. The second term of Equation 1 shapes the input current in No-Dimmer Mode for power factor correction. In Dimmer Mode, the second term is zero and, thus, the actual average input current $i_{IN}$ maintains the value of the target average input current value $i_{IN\_AVG\_T}$ until the switching power converter 508 delivers a target amount of charge $Q_{TARGET}$ to the load 216. In the No-Dimmer Mode, the first term is zero and, thus, input current $i_{IN}$ is shaped to provide power factor correction. If neither term is zero, the multi-mode current controller 504 is operating in Transition Mode or High Power Mode.

In at least one embodiment, in the Dimmer Mode, the controller 502 controls the switching power converter 508 so that the same amount of charge is provided to the load 216 during each half line cycle of the input voltage $V_{IN}$. In at least one embodiment, this Dimmer Mode process ensures that the output current $i_{OUT}$ to the load 216 is regulated as an approximately constant value irrespective of the instantaneous input current $i_{IN}$. In each line cycle of the input voltage $V_{IN}$, the control signal $CS_2$ causes the FET 510 to cycle until the switching power converter 508 provides a target amount of charge $Q_{TARGET}$ to the load 216. In at least one embodiment, the multi-mode current controller 504 determines the predetermined target charge $Q_{TARGET}$ in accordance with Equation 2:

$$Q_{TARGET} = i_{OUT} \cdot \text{Dim} \cdot HLC_{PERIOD}. \qquad \text{Equation 2}$$

$i_{OUT}$ is the current to the load 216.

Dim is the phase angle of a phase-cut edge of the input voltage $V_{IN}$, as phase-cut by the dimmer 206, divided by 180°.

$HLC_{PERIOD}$ is the half line cycle period measured in seconds of the supply voltage $V_{supply}$, which is generally 1/100 or 1/120 for a respective 50 Hz or 60 Hz AC supply voltage $V_{SUPPLY}$.

The charge provided ('pushed') to the secondary-winding 118 and, thus, to the load 216 in one half line cycle of the supply voltage $V_{SUPPLY}$, is pushed charge $Q_{PUSHED}$ in accordance with Equation 3:

$$Q_{pushed} = \sum_{1}^{M}\left(\frac{N}{2}\right) \times I_{peak} \times T2 \qquad \text{Equation 3}$$

M is the number of cycles of the control signal $CS_2$ during the half line cycle of the supply voltage $V_{SUPPLY}$. The value of M determines the amount of active time of the control signal $CS_2$. The higher the value of M the more charge is pushed to the load 216.

N is the turns ratio for the transformer 116.

T2 is the decay time of the input current $i_{IN}$ for each cycle of the switch control signal CS falls to 0 A.

$i_{PEAK}$ is the peak value of the input current $i_{IN}$, which is an approximately constant value for the Dimmer Mode as shown in waveforms 404 (FIG. 4).

In at least one embodiment, the multi-mode current controller 504 and the switching power converter current controller 506 ensure that the control signal $CS_2$ switches during a cycle of the input voltage $V_{IN}$ until $Q_{PUSHED} \approx Q_{TARGET}$. In the Dimmer Mode, to ensure that pushed charge $Q_{PUSHED}$ approximately equals target charge $Q_{TARGET}$, the switching power converter current controller 506 stops switching the FET 510 when pushed charge $Q_{PUSHED}$ exceeds target charge $Q_{TARGET}$. In the No Dimmer Mode, to provide power factor correction, the switching power converter current controller 506 does not stop switching the control signal $CS_2$ and instead the integrated error term Qe is fed back to Equation 1. In at least one embodiment, integrated error term Qe is determined from a charge error term $Q_{ERR}$. $Q_{ERR}$ is determined by the multi-mode current controller 504 in accordance with Equation 4:

$$Q_{ERR} = Q_{TARGET} - Q_{PUSHED} \qquad \text{Equation 4}$$

The integrated error during a cycle of the rectified input voltage $V_{IN}$ is depicted in Equation 5.

$$Q_e = k \int Q_{ERR} \qquad \text{Equation 5}$$

"k" is a scaling factor. The value of k scales integrated error term Qe to between 0 and the peak value $i_{PEAK}$ of the input current $i_{IN}$ and depends on the number of bits used by the controller 502.

In at least one embodiment, the multi-mode current controller 504 initially starts in the Dimmer Mode. In Dimmer Mode, integrated error term $Q_e$ is forced to zero so that the second term of Equation 1 does not impact the determination of the peak value $i_{PEAK}$ of the input current $i_{IN}$ by the multi-mode current controller 504.

When the controller 502 detects an absence of the dimmer 206, the multi-mode current controller 504 initiates operation in the Transition Mode. In the Transition Mode, the multi-mode current controller 504 slowly reduces the value of the target average input current value $i_{IN\_AVG\_T}$, which in turn slowly reduces the peak value $i_{PEAK\_DIMMER}$ of the input current $i_{IN}$. "$i_{PEAK\_DIMMER}$" represents the value of the first term of Equation 1. The particular rate and function used to reduce the target average input current value $i_{IN\_AVG\_T}$ during the Transition Mode is a matter of design choice. In at least one embodiment, the function is a linear function that reduces the target average input current value $i_{IN\_AVG\_T}$ from the predetermined value to 0 over R cycles of the input voltage $V_{IN}$. In at least one embodiment, the value of R is at or about 200. The value of R is a matter of design choice, and, in at least one embodiment, is a result of the rate of transition of the target input current value $i_{IN\_AVG\_T}$ to 0 in the Transition Mode. As the target average input current value $i_{IN\_AVG\_T}$ decreases, the peak value $i_{PEAK\_DIMMER}$ also decreases. At some time during the Transition Mode, the peak current determined by only the first term of Equation 1 will be unable to provide sufficient charge to the load 216, and pushed charge $Q_{PUSHED}$ will be less than target charge $Q_{TARGET}$. When pushed charge $Q_{PUSHED}$ is less than target charge $Q_{TARGET}$, the integrated charge error Qe in accordance with Equation 3 increases from zero to a non-zero value. When the integrated error Qe becomes non-zero, the second term of Equation 1 contributes to the determination of the peak value $i_{PEAK}$ of the input current $i_{IN}$. When the target average input current value $i_{IN\_AVG\_T}$ is finally forced to 0, the integrated charge error Qe has settled to a steady state value, and the second term in Equation 1 completely determines the peak value $i_{PEAK}$ of the input current $i_{IN}$. Thus, the controller 202 has transitioned from the Dimmer Mode to the No Dimmer Mode.

Additionally, in at least one embodiment, the switching power converter current controller 506 can adjust the period TT of the control signal $CS_2$ to compensate for any differences in a post-decay time of the input current $i_{IN}$ between the Dimmer Mode and the No Dimmer Mode. In at least one embodiment, when transitioning from Dimmer Mode to No Dimmer Mode, the post-decay time is adjusted to ensure that the switching power converter current controller 506 generates the control signal $CS_2$ to cause the FET 510 to maintain power factor correction and efficiency in the valleys (i.e. low and high phase angles) of the input voltage $V_{IN}$. The value of the post-decay time is, in at least one embodiment, 1.5-2 μs in Dimmer Mode and is reduced in No Dimmer Mode to a value that allows switching in the valley of the input voltage $V_{IN}$.

The rate of the transition between the Dimmer Mode to the No Dimmer Mode (i.e. the duration of the Transition Mode) is a matter of design choice. In at least one embodiment, the rate of transition is slow enough so that a dip in the output current $i_{OUT}$ due to pushed charge $Q_{PUSHED}$ being less than target charge $Q_{TARGET}$ is small enough that there is no human noticeable evidence of the transition. For example, there is no noticeable flicker in a light output of a lamp load for load 216. The controller 502 can be implemented using any technology including as an integrated circuit, as discrete circuit components, as a combination of integrated and discrete circuits, and as any combination of hardware and software.

Figure 6:
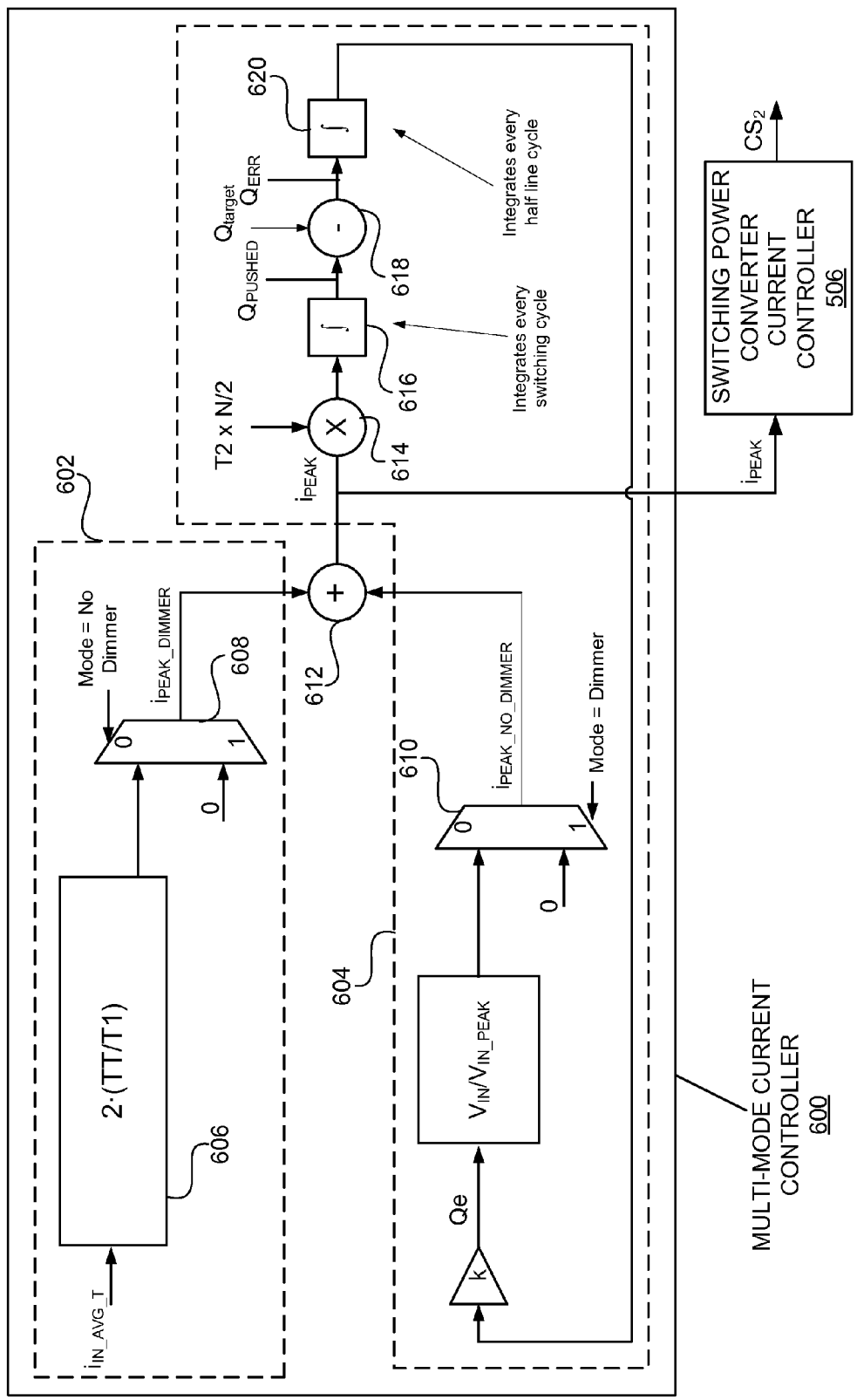
FIG. 6 depicts an embodiment of a multi-mode current controller.

FIG. 6 depicts a multi-mode current controller process 600, which represents one embodiment of the multi-mode current controller 504. The multi-mode current controller process 600 includes a Dimmer Mode process 602 and a No Dimmer Mode process 604. As the Dimmer Mode process 602 is deemphasized by decreasing the value of the target average input current value $i_{IN\_AVG\_T}$, the No Dimmer Mode process 604 is emphasized by driving the integrated charge error Qe to a steady-state value. The processes depicted in FIG. 6 represent one embodiment that allows the electronic system 500 to operate exclusively in Dimmer Mode, operate exclusively in No Dimmer Mode, transition between the Dimmer Mode and the No Dimmer Mode in the Transition Mode, and operate in the High Power Mode. In at least one embodiment, the multi-mode current controller process 600 operates to provide transitions between the dimmer and no dimmer current control modes without abruptly changing an amount of pushed charge $Q_{PUSHED}$ delivered to the load 216, which avoids power surges as indicated by, for example, flicker in a light source.

Figure 7:
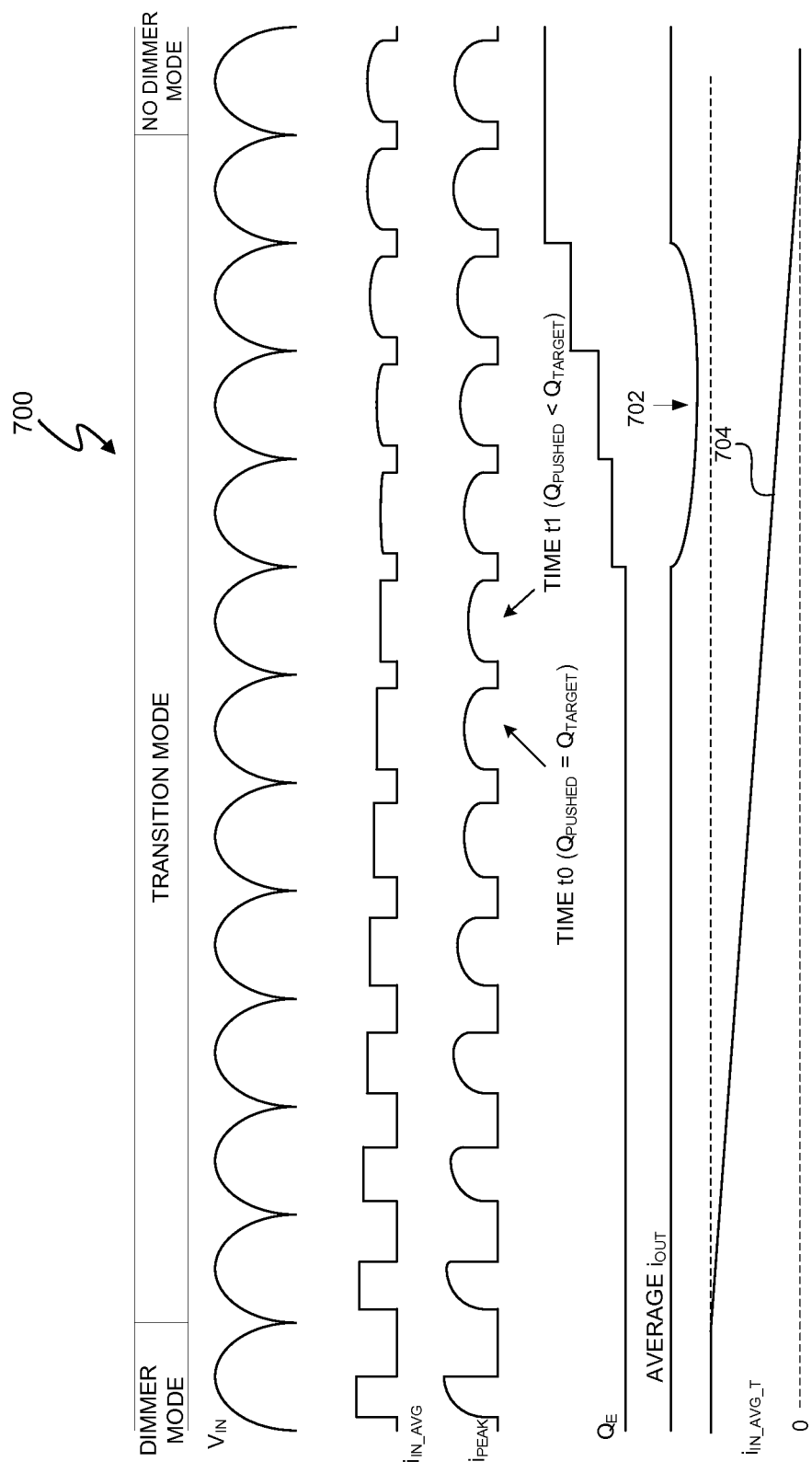
FIG. 7 depicts exemplary waveforms associated with one embodiment of the controller of FIG. 6.

FIG. 7 depicts exemplary transitional waveforms 700 associated with a transitional mode current control process of the multi-mode current controller process 600 and the electronic system 500. The depicted small dip in the average output current $i_{OUT}$ and the rate of transition from Dimmer Mode to No Dimmer Mode (also referred to as the duration of the Transition Mode) has been exaggerated for purposes of illustration. For example, in at least one embodiment, a normal Transition Mode duration is equivalent to approximately 200 cycles of the input voltage $V_{IN}$. The waveforms 700 depict the input voltage $V_{IN}$ and how the peak value $i_{PEAK}$ value of the input current $i_{IN}$, the actual average value $i_{IN\_AVG}$ of the input current $i_{IN}$, the integrated error Qe, and the average output current $i_{OUT}$ respond to forcing the target average input current value $i_{IN\_AVG\_T}$ to 0 during the Transition Mode from Dimmer to No Dimmer Mode. In at least one embodiment, thus, the function used to force the target average input current value $i_{IN\_AVG\_T}$ to 0 also determines the duration of the Transition Mode because the Transition Mode will start when target average input current value $i_{IN\_AVG\_T}$ begins to decrease and will stop when the target average input current value $i_{IN\_AVG\_T}$ reaches 0.

Referring to FIGS. 5, 6, and 7, the Dimmer Mode process 602 and the No Dimmer Mode process 604 implement Equation 1 through Equation 5. In at least one embodiment, the multi-mode current controller 504 initializes in the Dimmer Mode process 602. The target average input current value $i_{IN\_AVG\_T}$ is set as previously described (e.g. by programming or by a resistance value of an external resistor to the controller 502). Operation 606 multiplies the target average input current value $i_{IN\_AVG\_T}$ and 2 (TT/T1) to determine a Dimmer Mode peak value $i_{PEAK\_DIMMER}$ of the input current $i_{IN}$ as indicated in the first term of Equation 1. Assuming the controller 502 has not detected a dimmer 206, the multiplexer 608 passes the output peak value $i_{PEAK\_DIMMER}$, and multiplexer 610 passes a 0 so that $i_{PEAK\_NO\_DIMMER}$ equals 0. Thus, the second term of Equation 1 is set to 0. Thus, the output of summer 608 is $i_{PEAK\_DIMMER}$, and the peak value $i_{PEAK}$ of the input current $i_{IN}$ equals $i_{PEAK\_DIMMER}$. The peak value $i_{PEAK}$ is received by the switching power converter current controller 506, and switching power converter current controller 506 maintains the control signal $CS_2$ at a logical 1 until the multi-mode current controller 504 determines that the input current $i_{IN}$ has or will reach the peak value $i_{PEAK}$. The multi-mode current controller 504 forces the integrated charge error Qe to 0 when a dimmer 206 is detected.

When the controller 502 does not detect dimmer 206 and enters the Transition Mode, both multiplexers 608 and 610 are set to select the 0 input so that the respective outputs are $i_{PEAK\_DIMMER}$ and $i_{PEAK\_NO\_DIMMER}$. Summer 612 adds the peak value $i_{PEAK}$ components $i_{PEAK\_DIMMER}$ and $i_{PEAK\_NO\_DIMMER}$ values each cycle of the control signal $CS_2$ to determine a new peak value $i_{PEAK}$ for the input current $i_{IN}$. Multiplier 614 multiplies the peak value $i_{PEAK}$ times T2 N/2 (the decay time of the secondary-side current $i_S$), and integrator 616 integrates the product of $i_{PEAK}$ and T2 each cycle of control signal $CS_2$ to generate the amount of pushed charge $Q_{PUSHED}$ to the load 216 consistent with Equation 3. In at least one embodiment, the value of N/2 is fixed or programmed into the multi-mode current controller 504 and incorporated into the value of $Q_{TARGET}$ so that the multi-mode current controller 504 does not perform an "N/2" multiplication. Subtractor 618 determines a difference between the amount of pushed charge $Q_{PUSHED}$ and the target charge $Q_{TARGET}$ to be pushed to the load 216. In at least one embodiment, the target charge $Q_{TARGET}$ is determined by the multi-mode current controller 504 in accordance with Equation 2.

The error value $Q_{ERR}$ represents the difference, which is consistent with Equation 4. Integrator 620 integrates the error value $Q_{ERR}$ every half line cycle of the supply voltage $V_{SUPPLY}$ (i.e. every cycle of the input voltage $V_{IN}$). The output of the integrator 620 is multiplied by the constant k to generate the integrated error signal Qe, which is consistent with Equation 5.

The multi-mode current controller 504 slowly drives down the target average input current value $i_{IN\_AVG\_T}$ in accordance with the linear function 704 as shown in FIG. 7. Driving down the target average input current value $i_{IN\_AVG\_T}$ drives the peak current value $i_{PEAK}$ down, which in turn drives down the value of pushed charge $Q_{PUSHED}$. After time t0, the Dimmer Mode process 602 is unable to push enough charge, and target charge $Q_{TARGET}$ is greater than pushed charge $Q_{PUSHED}$ at time t1. When target charge $Q_{TARGET}$ is greater than pushed charge $Q_{PUSHED}$, the value of the integrated error value Qe increases during each subsequent cycle of the input voltage $V_{IN}$ during the Transition Mode. As the integrated error value Qe increases and the value of the target average input current value $i_{IN\_AVG\_T}$ decreases, as shown in FIG. 7, the No Dimmer Mode process 604 begins to dominate the determination of the peak value $i_{PEAK}$ of the input current $i_{IN}$. As the No Dimmer Mode process influence increases, the average input current value $i_{IN\_AVG}$ begins to track the shape of the input voltage $V_{IN}$, thus, providing power factor correction. The small current dip 704 illustrates an exaggerated drop in the output current $i_{OUT}$ as the multi-mode current controller 504 transitions from Dimmer Mode to No Dimmer Mode. In at least one embodiment, the effect of the current dip does not result in a noticeable flicker of an LED-based lamp load 216.

The Transition Mode of FIGS. 6 and 7 take, for example, 200 cycles of the input voltage $V_{IN}$ which equals 1.67 seconds for a 120 Hz input voltage $V_{IN}$ frequency, i.e. 200 cycles/120 cycles. In another embodiment, the transition between No Dimmer Mode and Dimmer Mode is accelerated to an almost instantaneous transition while maintaining an approximately constant output current $i_{OUT}$ by predetermining a value of integrated error value Qe rather than allowing the value of integrated error value Qe to settle to a steady state value as in the multi-mode current controller process 600. Once integrated error value Qe is predetermined, the peak current value $i_{PEAK}$ is determined solely by the No Dimmer Mode process 604 using the predetermined value of integrated error value Qe. In at least one embodiment, integrated error value Qe is determined in accordance with Equation 6:

$$Q_e = (k * Qerr) \quad \text{Equation 6}$$

$$= Q_{target_{value}} * \text{pi} * \left\{0.654\left(\frac{nVo}{Vpk}\right) + 0.51\right\}$$

Pi=3.1415

Vpk=170 or 325 (depending on mode 120 bit)

$$Q_{target_{value}} = I_{target} * \left(\frac{2}{N}\right)$$

is preprogrammed in the controller 502 are indicated by an external resistor value (not shown)

"nVo" is determined in accordance with Equation 7:

$$nVo = V_{LD} * \frac{T1}{T2} \quad \text{Equation 7}$$

The controller 502 senses the value of the input voltage $V_{IN}$, measures the pulse width T1 of the control signal $CS_2$, and measures the decay time of the secondary current $i_S$. Once the value of $nV_O$ is settled, the multi-mode current controller 504 uses the value of integrated error value Qe and immediately transitions to the No Dimmer Mode process 604.

In at least one embodiment, for high power devices, the multi-mode current controller 504 combines the Dimmer Mode and No Dimmer Mode operations to efficiently regulate the output current $i_{OUT}$ in the High Power Mode. Referring to FIGS. 5 and 6, in at least one embodiment, the target average input current value $i_{IN\_AVG\_T}$ value is set in accordance with an expected power demand of the load 216. In at least one embodiment, the target average input current value $i_{IN\_AVG\_T}$ is set below a value that would allow the Dimmer Mode process 602 alone to determine a peak value $i_{PEAK}$ of the input current $i_{IN}$ sufficient to make pushed charge $Q_{PUSHED}$ greater than target charge $Q_{TARGET}$. For example, if the power demand of the load 216 indicated a target average input current value $i_{IN\_AVG\_T}$ of 20 mA, the target average input current value $i_{IN\_AVG\_T}$ is set to 15 mA. Thus, during a cycle of the input voltage $V_{IN}$, the Dimmer Mode process 602 will not generate a peak value $i_{PEAK}$ of the input current $i_{IN}$ sufficient to make pushed charge $Q_{PUSHED}$ greater than target charge $Q_{TARGET}$. Thus, the integrated charge error Qe will increase, and the No Dimmer Mode process 604 will contribute to the determination of the peak value $i_{PEAK}$ to the extent that the Dimmer Mode process 602 does not result in sufficient charge transfer to the load 216.

Figure 8:
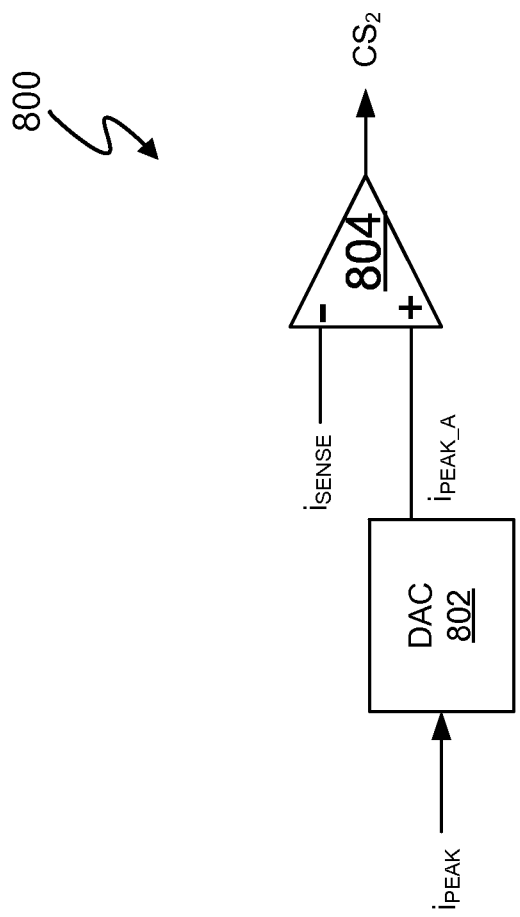
FIG. 8 depicts an exemplary switching power converter current controller.

FIG. 8 depicts a switching power converter current controller 800, which represents one embodiment of the switching power converter current controller 506. The multi-mode current controller 504 determines the peak current value $i_{PEAK}$ of the input current $i_{IN}$, and the digital-to-analog converter 802 converts the peak current $i_{PEAK}$ value to an analog peak current signal $i_{PEAK\_A}$ that is scaled to correspond to the same scale as sense current signal $i_{SENSE}$. The comparator 804 drives the control signal $CS_2$ to a logical 0 until the value of the sense current signal $i_{SENSE}$ exceeds the value of the analog sense current signal $i_{PEAK\_A}$. When the value of the sense current signal $i_{SENSE}$ exceeds the value of the analog sense current signal $i_{PEAK\_A}$, the comparator 804 drives the control signal $CS_2$ to a logical 0.

Thus, in at least one embodiment, a controller transitions operation of a switching power converter between multiple modes of operation depending on whether the controller detects a dimmer or not and when operating in a High Power Mode.

Although embodiments have been described in detail, it should be understood that various changes, substitutions, and alterations can be made hereto without departing from the spirit and scope of the invention as defined by the appended claims.

What is claimed is:

1. An method comprising:
   detecting whether a dimmer is phase cutting an input voltage to a switching power converter;
   operating the switching power converter in a first mode if the dimmer is detected;

operating the switching power converter in a second mode if phase cutting of the input voltage is not detected;
transitioning between operating the switching power converter in the first mode and the second mode if a status of a detection of the dimmer changes; and
operating the switching power converter in both the first and second modes to meet a power demand of a load coupled to the switching power converter, wherein operating the switching power converter in both the first and second modes to meet power a power demand of a load coupled to the switching power converter comprises:
setting an average input current target value for an input current to the switching power converter for operation of the switching power converter in the first mode, wherein the average input current target is insufficient to allow the switching power converter to provide a sufficient charge to meet a charge demand by a load coupled to the switching power converter; and
operating the switching power converter in the second mode to allow the switching power converter to provide the sufficient charge to meet the charge demand by the load coupled to the switching power converter.

2. The method of claim 1 further comprising:
generating a control signal to control a switch to control a current in the switching power converter;
wherein operating the switching power converter in the first mode if the dimmer is detected comprises operating the switching power converter to draw a substantially constant average input current to the switching power converter during an active time of the control signal.

3. The method of claim 1 wherein operating the switching power converter in the second mode if the dimmer is not detected comprises operating the switching power converter to draw an input current to the switching power converter to provide a power factor correction.

4. The method of claim 1 wherein the switching power converter is a single stage flyback-type switching power converter.

5. The method of claim 1 wherein detecting whether a dimmer is phase cutting an input voltage to the switching power converter comprises:
detecting the dimmer if less than a substantial amount of the input voltage is not passed by the dimmer; and
not detecting the dimmer if at least a substantial amount of the input voltage is passed by the dimmer;
wherein the substantial amount of the input voltage is passed if the dimmer passes at least 170 degrees of the input voltage for a cycle of the input voltage, and the cycle of the input voltage ranges from 0-180°.

6. The method of claim 1 wherein:
operating the switching power converter in the first mode if the dimmer is detected comprises operating the switching power converter in the first mode to regulate an output current to a load;
operating the switching power converter in the second mode if the dimmer is not detected comprises operating the switching power converter in the second mode to regulate the output current to the load; and
the load comprises one or more light emitting diodes.

7. The method of claim 1 further comprising:
initiating operation of the switching power converter in the first mode prior to detecting whether a dimmer is phase cutting the input voltage to the switching power converter.

8. The method of claim 7 wherein:
operating the switching power converter in the first, second, and transition modes comprises:
determining a peak value of an input current to the switching power converter; and
controlling the input current to a switch coupled to the switching power converter so that the switch conducts the input current until the input current reaches the peak value and then turning the switch off; and
transitioning between operating the switching power converter in the first mode and the second mode if a status of detection of the dimmer changes comprises transitioning between emphasis of a first term to emphasis of a second term of the following equation for determining the peak value of the input current to the switching power converter:

$$I_{PEAK} = \left(2 \times i_{IN\_AVG\_T} \times \frac{TT}{T_1}\right) + \left(Q_e \times \frac{V_{IN}}{V_{IN\_PEAK}}\right)$$

$i_{IN\_AVG\_T}$ represents the average target value of an input current to the switching power converter;
TT equals a switching period of a control signal that controls input current to the switching power converter, and value of TT is measured from a previous cycle of the control signal;
T1 is a pulse width of the control signal measured from a previous cycle of the control signal;
$V_{IN}$ is an input voltage to the switching power converter;
$V_{IN\_PEAK}$ is a peak input voltage during a switching cycle of the control signal; and
$Q_e$ is a charge integration error;

$$\left(2 \times i_{IN\_AVG\_T} \times \frac{TT}{T_1}\right)$$

wherein
is the first term of the equation, and $$\left(Q_e \times \frac{V_{IN}}{V_{IN\_PEAK}}\right)$$

is the second term of the equation.

9. The method of claim 8 wherein transitioning between operating the switching power converter in the first mode and the second mode if a status of detection of the dimmer changes comprises:
approximately instantly transitioning from operating the switching power converter using the first term of the following equation to using the second term of the following equation by predetermining the value of Qe.

10. The method of claim 1 wherein operating the switching power converter in a first mode if the dimmer is detected comprises:
utilizing the first mode to determine a first peak value component of an input current to the switching power converter using a target average input current value, wherein the target average input current value is insufficient to allow the switching power converter to meet power demands of the load; and
utilizing the second mode to determine a second peak value component of the input current to allow the switching power converter to meet the power demands of the load.

11. An apparatus comprising:
a switching power converter;
a controller coupled to the switching power converter, wherein the controller is configured to:
- detect whether a dimmer is phase cutting an input voltage to a switching power converter;
- operate the switching power converter in a first mode if the dimmer is detected;
- operate the switching power converter in a second mode if phase cutting of the input voltage is not detected;
- transition between operating the switching power converter in the first mode and the second mode if a status of detection of the dimmer changes
- operate the switching power converter in both the first and second mode to meet a power demand of a load coupled to the switching power converter, wherein to operate the switching power converter in both the first and second modes to meet the power demand of a load coupled to the switching power converter comprises:
  - to set an average input current target value for an input current to the switching power converter for operation of the switching power converter in the first mode, wherein the average input current target is insufficient to allow the switching power converter to provide a sufficient charge to meet a charge demand by the load coupled to the switching power converter; and
  - to operate the switching power converter in the second mode to allow the switching power converter to provide the sufficient charge to meet the charge demand by the load coupled to the switching power converter.

12. An apparatus comprising:
a switching power converter; and
a controller coupled to the switching power converter, wherein the controller includes a dimmer detector and the dimmer detector generates a dimmer detection output that controls operational characteristics of the switching power converter in one of at least two different operational modes depending on whether the detector detects a dimmer.
wherein the controller is configured to:
- operate the switching power converter in both the first and second modes to meet a power demand of a load coupled to the switching power converter, wherein to operate the switching power converter in both the first and second mode to meet the power demand of a load coupled to the switching power converter comprises:
  - to set an average input current target value for an input current to the switching power converter for operation of the switching power converter in the first mode, wherein the average input current target is insufficient to allow the switching power converter to provide a sufficient charge to meet a charge demand by the load coupled to the switching power converter; and
- to also operate the switching power converter in the second mode to allow the switching power converter to provide the sufficient charge to meet the charge demand by the load coupled to the switching power converter.

13. An apparatus comprising:
a controller to control a switching power converter, wherein the controller is configured to:
- detect whether a dimmer is phase cutting an input voltage to the switching power converter;
- operate the switching power converter in a first mode if the dimmer is detected;
- operate the switching power converter in a second mode if phase cutting of the input voltage is not detected;
- transition between operating the switching power converter in the first mode and the second mode if a status of detection of the dimmer changes; and
- operate the switching power converter in both the first mode and the second mode to meet a power demand of a load coupled to the switching power converter, wherein to operate the switching power converter in both the first mode and the second mode to meet power the power demand of the load coupled to the switching power converter, the controller is further configured to:
  - set an average input current target value for an input current to the switching power converter for operation of the switching power converter in the first mode, wherein the average input current target is insufficient to allow the switching power converter to provide a sufficient charge to meet a charge demand by the load coupled to the switching power converter; and
  - also operate the switching power converter in the second mode to allow the switching power converter to provide the sufficient charge to meet the charge demand by the load coupled to the switching power converter.

14. The apparatus of claim 13 wherein the controller is further configured to:
generate a control signal to control a switch to control current in the switching power converter;
wherein to operate the switching power converter in the first mode if the dimmer is detected, the controller is further configured to operate the switching power converter to draw a substantially constant average input current to the switching power converter during an active time of the control signal.

15. The apparatus of claim 13 wherein to operate the switching power converter in the second mode if the dimmer is not detected, the controller is further configured to operate the switching power converter to draw an input current to the switching power converter to provide a power factor correction.

16. The apparatus of claim 13 wherein the switching power converter is a single stage flyback-type switching power converter.

17. The apparatus of claim 13 wherein to detect whether a dimmer is phase cutting an input voltage to the switching power converter, the controller is further configured to:
detect the dimmer if less than a substantial amount of the input voltage is not passed by the dimmer; and
not detect the dimmer if at least a substantial amount of the input voltage is passed by the dimmer;
wherein the substantial amount of the input voltage is passed if the dimmer passes at least 170 degrees of the input voltage for a cycle of the input voltage, and the cycle of the input voltage ranges from 0-180°.

18. The apparatus of claim 13 further comprising:
the switching power converter; and
a load coupled to the switching power converter, wherein the load comprises one or more light emitting diodes.

19. The apparatus of claim 13 wherein the controller is further configured to:
initiate operation of the switching power converter in the first mode prior to detecting whether a dimmer is phase cutting the input voltage to the switching power converter.

20. The apparatus of claim 13 wherein:
to operate the switching power converter in the first, second, and transition modes, the controller is further configured to:
determine a peak value of an input current to the switching power converter; and
control the input current to a switch coupled to the switching power converter so that the switch conducts the input current until the input current reaches the peak value and then turning the switch off; and
to transition between operating the switching power converter in the first mode and the second mode if a status of detection of the dimmer changes, the controller is further configured to transition between operating the switching power converter in the first mode and the second mode if a status of detection of the dimmer changes comprises transitioning between emphasis of a first term to emphasis of a second term of the following equation for determining the peak value of the input current to the switching power converter:

$$I_{PEAK} = \left(2 \times i_{IN\_AVG\_T} \times \frac{TT}{T_1}\right) + \left(Q_e \times \frac{V_{IN}}{V_{IN\_PEAK}}\right)$$

$i_{IN\_AVG\_T}$ represents the average target value of an input current to the switching power converter;
TT equals a switching period of a control signal that controls input current to the switching power converter, and value of TT is measured from a previous cycle of the control signal;
T1 is a pulse width of the control signal measured from a previous cycle of the control signal;
$V_{IN}$ is an input voltage to the switching power converter;
$V_{IN\_PEAK}$ is a peak input voltage during a switching cycle of the control signal; and Qe is a charge integration error;

$$\left(2 \times i_{IN\_AVG\_T} \times \frac{TT}{T_1}\right)$$

wherein
is the first term of the equation, and $$\left(Q_e \times \frac{V_{IN}}{V_{IN\_PEAK}}\right)$$

is the second term of the equation.

21. The apparatus of claim 20 wherein to transition between operating the switching power converter in the first mode and the second mode if a status of detection of the dimmer changes, the controller is further configured to:
approximately instantly transition from operating the switching power converter using the first term of the following equation to using the second term of the following equation by predetermining the value of Qe.

22. The apparatus of claim 13 wherein to operate the switching power converter in a first mode if the dimmer is detected, the controller is further configured to:
utilize the first mode to determine a first peak value component of an input current to the switching power converter using a target average input current value, wherein the target average input current value is insufficient to allow the switching power converter to meet power demands of the load; and
utilize the second mode to determine a second peak value component of the input current to allow the switching power converter to meet the power demands of the load.

* * * * *